United States Patent
Kaplanyan

(10) Patent No.: US 8,542,231 B2
(45) Date of Patent: Sep. 24, 2013

(54) METHOD, COMPUTER GRAPHICS IMAGE RENDERING SYSTEM AND COMPUTER-READABLE DATA STORAGE MEDIUM FOR COMPUTING OF INDIRECT ILLUMINATION IN A COMPUTER GRAPHICS IMAGE OF A SCENE

(75) Inventor: Anton Kaplanyan, Frankfurt (DE)

(73) Assignee: Crytek GmbH, Frankfurt (DE)

( * ) Notice: Subject to any disclaimer, the term of this patent is extended or adjusted under 35 U.S.C. 154(b) by 640 days.

(21) Appl. No.: 12/825,973

(22) Filed: Jun. 29, 2010

(65) Prior Publication Data

US 2011/0012901 A1 Jan. 20, 2011

Related U.S. Application Data

(60) Provisional application No. 61/221,210, filed on Jun. 29, 2009, provisional application No. 61/306,163, filed on Feb. 19, 2010.

(51) Int. Cl.
*G06T 15/50* (2011.01)

(52) U.S. Cl.
USPC ............ 345/426; 345/419; 345/424; 345/581

(58) Field of Classification Search
USPC .................................. 345/419, 424, 426, 581
See application file for complete search history.

(56) References Cited

U.S. PATENT DOCUMENTS

| | | | |
|---|---|---|---|
| 6,903,741 B2 * | 6/2005 | Corbetta ........................ | 345/426 |
| 7,012,604 B1 * | 3/2006 | Christie et al. ................ | 345/426 |
| 7,262,770 B2 | 8/2007 | Sloan et al. | |
| 7,286,135 B2 * | 10/2007 | Wang et al. .................... | 345/582 |
| 7,609,265 B2 * | 10/2009 | Sloan et al. .................... | 345/426 |
| 7,948,490 B2 * | 5/2011 | Sloan et al. .................... | 345/426 |
| 2008/0012857 A1 * | 1/2008 | Sun et al. ........................ | 345/426 |
| 2008/0259081 A1 * | 10/2008 | Bunnell ......................... | 345/426 |
| 2009/0102843 A1 * | 4/2009 | Sloan et al. .................... | 345/426 |
| 2010/0091018 A1 * | 4/2010 | Tatarchuk et al. ............. | 345/423 |

OTHER PUBLICATIONS

Bavoil, L., Sainz, M., and Dimitrov, R., 2008. Image-space horizon-based ambient occlusion. ACM SIGGRAPH 2008 talks.
Bunnell, M. 2005. GPU Gems 2: Programming Techniques for High-Performance Graphics and General-Purpose Computation. Addison-Wesley Professional, ch. Dynamic Ambient Occlusion and Indirect Lighting, 636-648.

(Continued)

*Primary Examiner* — Kimbinh T Nguyen
(74) *Attorney, Agent, or Firm* — Renner, Otto, Boisselle & Sklar, LLP

(57) ABSTRACT

Method for real-time computing of indirect illumination in a computer graphics image of a scene, comprising: defining a light propagation volume as a three-dimensional grid consisting of a plurality of grid cells; allocating a plurality of secondary light sources to grid cells of said light propagation volume; accumulating directional, colored irradiance contributions of all secondary light sources in a respective grid cell and repeating this step of accumulating for all grid cells of the light propagation volume to thereby obtain an initial indirect light intensity distribution. The propagation of light in said light propagation volume is then iteratively computed starting with the initial indirect light intensity to obtain a final indirect light intensity distribution, which is used for rendering the scene illuminated by the final indirect light intensity distribution during a usual scene rendering process from a camera's point of view.

31 Claims, 18 Drawing Sheets

(56) References Cited

OTHER PUBLICATIONS

Dachsbacher, C., and Stamminger, M. 2005. Reflective shadow maps. In Proc. of the Symposium on Interactive 3D Graphics and Games, 203-213.

Dachsbacher, C., and Stamminger, M. 2006. Splatting Indirect Illumination. In Proc. of the Symposium on Interactive 3D Graphics and Games, 93-100.

Dachsbacher, C., Stamminger, M., Drettakis, G., and Durand, F. 2007. Implicit visibility and antiradiance for interactive global illumination. ACM Transactions on Graphics (Proc. of SIGGRAPH 2007) 26,3.

Dong, Z., Kautz, J., Theobalt, C., and Seidel, H.-P. 2007. Interactive Global Illumination Using Implicit Visibility. In Pacific Graphics, 77-86.

Ak Peters. Fattal, R. 2009. Participating media illumination using light propagation maps. ACM Transaction on Graphics 28,1,1-11.

Geist, R., Rasche, K, Westall, J., and Schalkoff, R.J. 2004. Lattice-Boltzmann lighting. In Rendering Techniques 2004 (Proc. of the Eurographics Symposium on Rendering, 355-362).

Greger, G., Shirley, P., Hubbard, P.M., and Greenberg, D.P. 1998. The irradiance volume. IEEE Computer Graphics Applications 18,2,32-43.

Hašan, M., Pellacini, F., and Bala, K. 2007. Matrix row-column sampling for the many-light problem. ACM Trans. Graph. 26,3,26.

Iwasaki, K., Dobashi, Y., Yoshimoto, F., and Nishita, T. 2007. Precomputed radiance transfer for dynamic scenes taking into account light interreflection. In Rendering Techniques 2007 (Proc. of the Eurographics Symposium on Rendering), 35-44.

Keller, A. 1997. Instant radiosity. In SIGGRAPH '97: Proceedings of the 24th annual conference on Computer graphics and interactive techniques, 49-56.

Krivanek, J., and Colbert, M. 2008. Real-time shading with filtered importance sampling. Computer Graphics Forum 27, 4, 1147-1154.

Losasso, F., and Hoppe, H. 2004. Geometry clipmaps: terrain rendering using nested regular grids. In SIGGRAPH '04: ACM SIGGRAPH 2004 Papers, 769-776.

McGuire, M., and Luebke, D. 2009. Hardware-accelerated global illumination by image space photon mapping. In HPG '09: Proceedings of the Conference on High Performance Graphics 2009, 77-89.

Mittring, M. 2007. Finding Next-Gen: CryEngine 2. In SIGGRAPH'07: ACM SIGGRAPH 2007 courses.

Nichols, G., and Wyman, C. 2009. Multiresolution splatting for indirect illumination. In I3D '09: Proceedings of the 2009 symposium on Interactive 3D graphics and games, 83-90.

Nichols, G. Shopf, J., and Wyman, C. 2009. Hierarchical image-space radiosity for interactive global illumination. Computer Graphics Forum 28, 4, 1141-1149.

Oat, C. 2006. Irradiance volumes for real-time rendering. ShaderX 5: Advanced Rendering Techniques.

Ramamoorthi, R., and Hanrahan, P. 2001. On the relationship between radiance and irradiance: determining the illumination from images of a convex Lambertian object. J. Opt. Soc. Am. A 18, 10, 2448-2459.

Ramankutty, M.A., and Crosbie, A.L. 1997. Modified discrete ordinates solution of radiative transfer in two-dimensional dimensional rectangular enclosures. J. Quantitative Spectroscopy Radiative Transfer 57, 107-140.

Ritschel, T., Grosch, T., Kim, M.H., Seidel, H.-P., Dachsbacher, C., and Kautz, J. 2008. Imperfect shadow maps for efficient computation of indirect illumination. ACM Transactions on Graphics (Proc. of SIGGRAPH Asia) 27, 5.

Ritschel, T., Engelhardt, T., Grosch, T., Seidel, H.-P., Kautz, J., and Dachsbacher, C. 2009. Micro-rendering for scalable, parallel final gathering. ACM Trans. Graph. (Proc. SIGGRAPH Asia 2009) 28, 5.

Ritschel, T., Grosch, T., and Seidel, H.-P. 2009. Approximating dynamic global illumination in image space. In I3D '09: Proceedings of the 2009 symposium on Interactive 3D graphics and games, 75-82.

Sillion, F. 1995. A Unified Hierarchical Algorithm for Global Illumination with Scattering Volumes And Object Clusters. IEEE Trans. on Visualization and Computer Graphics 1, 3, 240-254.

Sloan, P.-P., Kautz, J., and Snyder, J. 2002. Precomputed radiance transfer for real-time rendering in dynamic, low-frequency lighting environments. ACM Transactions on Graphics (Proc. of SIGGRAPH 2002) 21, 3, 527-536.

Sloan, P.-P., Govindaraju, N., Nowrouzezahrai, D., and Snyder, J. 2007. Image-based proxy accumulation for real-time soft global illumination. In Pacific Graphics, 97-105.

Sloan, P.-P., 2008. Stupid spherical harmonics tricks. Presentation, Game Developer Conference (GDC2008), San Francisco, CA, http://www.ppsloan.org/publications/StupidSH35.pdf.

Tatarchuk, N., Chen, H., Evans, A., Kaplanyan, A., Moore, J., Jeffries, D., Yang, J., and Engel, W. 2009. Advances in Real-Time Rendering in 3D Graphics and Games. In SIGGRAPH'09: ACM SIGGRAPH 2009 courses.

Walter, B., Fernandez, S., Arbree, A., Bala, K., Donikian, M., and Greenberg, D. P. 2005. Lightcuts: A scalable approach to illumination. ACM Transactions on Graphics (Proc. of SIGGRAPH 2005) 24, 3, 1098-1107.

Wang, R., Wang, R., Zhou, K, Pan, M., and Bao, H. 2009. An efficient gpu-based approach for interactive global illumination. ACM Transactions on Graphics (Proc. of SIGGRAPH 2009) 28, 3, 1-8.

Yu, I., Cox, A., Kim, M.H. Ritschel, T., Grosch, T., Dachsbacher, C., and Kautz, J. 2009. Perceptual influence of approximate visibility in indirect illumination. ACM Transactions on Applied Perception 6, 4, 1-14.

* cited by examiner

METHOD, COMPUTER GRAPHICS IMAGE RENDERING SYSTEM AND COMPUTER-READABLE DATA STORAGE MEDIUM FOR COMPUTING OF INDIRECT ILLUMINATION IN A COMPUTER GRAPHICS IMAGE OF A SCENE

RELATED APPLICATIONS

The present application claims benefit and priority under 35 U.S.C. §119(e) of U.S. patent applications of the applicant Ser. No. 61/221,210 "A method, computer program product and device for computing a computer graphics image including diffuse lighting contributions" filed on Jun. 29, 2009 and Ser. No. 61/306,163 "A method, computer graphics image rendering system and computer-readable data storage medium for computing of indirect illumination in a computer graphics image of a scene" filed on Feb. 19, 2010, the whole contents of which are hereby incorporated by reference.

FIELD OF INVENTION

The present application relates in general to the computing of computer graphics images including diffuse lighting contributions, in particular for computer or video games, and relates in particular to a method, computer graphics image rendering system and computer-readable data storage medium for computing of indirect illumination in a computer graphics image of a scene.

BACKGROUND OF INVENTION

Lighting from area sources, soft shadows, and interreflections are important effects in the computer of computer graphics images. While still computer graphics images can be computer with high accuracy and realistic appearance, most methods for computing moving computer graphics images, in particular those integrating over large-scale lighting environments, are still impractical for real-time rendering despite the increasing computer and storage power of modern graphics processing units (GPU), graphics chipsets and graphics cards.

A tremendous amount of research has been conducted in the field of global illumination (GI), a more comprehensive overview of non-interactive methods being disclosed by Dutré P., Bala, K. and Bekaert, P. 2006, Advanced Global Illumination, A K Peters. Basically, these methods for interactive applications according to the prior art can be classified into five categories as outlined below, namely classic methods, precomputed and low-frequency radiance transfer, screen-space methods, instant radiosity methods and lattice-based method.

a) Classic methods: Huge progress has been made in the field of ray tracing. Although recent work achieves interactive performance with complex lighting effects [Wang et al. 2009], these methods are still not applicable to real-time applications with complex scenes. Recently, variants of radiosity methods tailored for graphics hardware have also been introduced. Dong et al. [2007] achieves interactive global illumination for small scenes, where visibility was evaluated directly on the hierarchical link mesh. Explicit visibility computations can be replaced by an iterative process using anti-radiance [Dachsbacher et al. 2007]. Although interactive GI in moderately complex scenes becomes possible, the use of dynamic objects is restricted. Bunnell [2005] coarsely approximates indirect illumination and ambient occlusion using a finite element technique allowing for deforming objects.

b) Precomputed and low-frequency radiance transfer: Many techniques for real-time global illumination precompute the light transport including all visibility information which entails restrictions such as static [Sloan et al. 2002] or semi-static scenes [Iwasaki et al. 2007]. Hašan et al. [2007] approximate global illumination by many point lights and present a scalable GPU-technique for high-quality images targeting rendering times of few seconds. The radiance transfer is often represented in spherical harmonics (SH) basis. Recently, the limitations of these methods have been eased, e.g. Sloan et al. [2007] demonstrate real-time indirect illumination for low-frequency incident lighting and visibility when these are represented with a small number of SH. This approach is disclosed also in U.S. Pat. No. 7,262,770 B2.

c) Screen-space methods: In recent years, GPU-friendly techniques operating in image space became popular, and are presently widely used. As any standard shadow map, the reflective shadow map (RSM) [Dachsbacher and Stamminger 2005] captures directly lit surfaces, but stores additional information that is required to compute the indirect illumination from these surfaces such that each pixel can be seen as a small light source. Rendering indirect illumination from the reflective shadow map can be implemented via sampling a subset of the pixel lights. Screen space ambient occlusion [Mittring 2007; Bavoil et al. 2008] is part of almost any real-time rendering engine nowadays. Recently, Ritschel et al. [2009b] extended these methods by accounting for directional lighting and show colored shadows and indirect illumination. Note that these techniques compute light transport over small distances (in image space) only, and typically require post-processing to reduce sampling artifacts. Image Space Photon Mapping recasts the initial and final photon bounces of traditional photon mapping as image-space operations on the GPU [McGuire and Luebke 2009], and achieves interactive to real-time frame rates for complex scenes. Ritschel et al. [2009a] accelerate final gathering with a parallel micro-rendering technique running on the GPU. They support BRDF importance sampling and report interactive frame rates for complex scenes.

d) Instant radiosity methods: The entire lighting in a scene can be approximated by a set of virtual point lights (VPLs) [Keller 1997], and techniques based on this instant radiosity idea have gained much attention in recent years. RSMs can be used to create VPLs for one bounce of indirect light, and their contribution can be accumulated in screen space using splatting [Dachsbacher and Stamminger 2006], or multi-resolution splatting [Nichols and Wyman 2009]. The latter computes the indirect lighting at a lower resolution for smooth surfaces, and more accurately where geometric detail is present. This idea has been further improved with smart clustering of the RSM's pixels [Nichols et al. 2009]. Note that all aforementioned methods compute one-bounce indirect illumination without occlusion only. Ritschel et al. present an efficient method to quickly generate hundreds of imperfect shadow maps. These allow the approximation of the indirect illumination from VPLs with sufficient quality. However, in order to avoid flickering and to provide temporal coherence a large number of VPLs is required (typically hundreds to thousands), and obviously this takes a toll on performance and prevents high frame rates in dynamic scenes.

e) Lattice-based methods: The Discrete Ordinates Method (DOM) [Chandrasekhar 1950] discretizes the quantities in the radiative transfer equation (RTE) in space and orientation (DOMs are typically used for computing radiative transfer in participating media). These discrete values are used to approximate the different terms in the RTE: the radiance distribution is stored in a 3D grid, and light is exchanged between neighboring volume elements, reducing the computation to local interactions only. A variant of these methods postulates a simple photon transport model that describes a diffusion process to compute light transport in participating media based on the lattice-Boltzmann method [Geist et al. 2004]. Recently, Fattal [2009] presented an improvement of DOMs to reduce light smearing (due to repeated interpolation) and ray effects (due to discretized directions). Note that although these methods are efficient, and (potentially) highly parallel, they do not run at interactive frame rates.

SUMMARY OF INVENTION

It is an object of the present invention to provide a scalable and computationally efficient technique for approximating indirect illumination in fully dynamic scenes for real-time computer graphics applications, in particular for video games and/or for high repetition frequencies of the computer graphics images to be computed.

According to the present invention there is provided a method for real-time computing of indirect illumination in a computer graphics image of a scene, comprising: defining in said scene a plurality of locations, attributing orientation and color to surface elements at said locations and defining a plurality of primary light sources; from a light source's point of view collecting depth information, orientation information and color information for said surface elements to thereby define a plurality of secondary light sources; defining a light propagation volume as a three-dimensional grid consisting of a plurality of grid cells; allocating said plurality of secondary light sources to grid cells of said light propagation volume; accumulating directional, colored irradiance contributions of all secondary light sources in a respective grid cell and repeating said step of accumulating directional, colored irradiance contributions of all secondary light sources for all grid cells of said light propagation volume to thereby obtain an initial indirect light intensity distribution; iteratively computing the propagation of light in said light propagation volume starting with said initial indirect light intensity for a predetermined number of times to thereby obtain a final indirect light intensity distribution; and rendering the scene illuminated by said final indirect light intensity distribution during a usual scene rendering process from a camera's point of view; wherein, for each step of iteratively computing the propagation of light in said light propagation volume, the light intensity distribution from a previous iteration step is taken as an input light intensity distribution for a subsequent iteration step.

According to further aspects of the present invention there are also provided a computer graphics image rendering system and a computer-readable data storage medium having program code stored thereon and executable on a graphics image processing device of a computer graphics image rendering system, capable of performing a method for real-time computing of indirect illumination in a computer graphics image of a scene according to the present invention as outlined in the appended claims and summary article.

According to the present invention, lattices and spherical harmonics are used to represent the spatial and angular distribution of light in the scene. The approach according to the present invention does not require any pre-computation and is enables the handling of large scenes with nested lattices. A further advantageous embodiment according to the present invention is primarily targeted at rendering single-bounce indirect illumination with occlusion. The approach according to the present invention can, however, be extended to handling multiple bounces and participating media. The method according to the present invention is capable of producing plausible, high-quality results even when running on current (state-of-the-art) game console hardware with a budget of only a few milliseconds for performing all computation steps required for real-time computing a high-quality computer graphics image including indirect lighting contributions. The approach according to the present invention can be combined with a variety of related real-time rendering techniques.

BRIEF DESCRIPTION OF THE DRAWINGS

Hereinafter the invention will be described with reference to the enclosed drawings, from which further features, advantages and technical effects achieved will become apparent.

DETAILED DESCRIPTION OF PREFERRED EMBODIMENTS OF THE PRESENT INVENTION

1. Light Propagation Volumes

Figure 1:
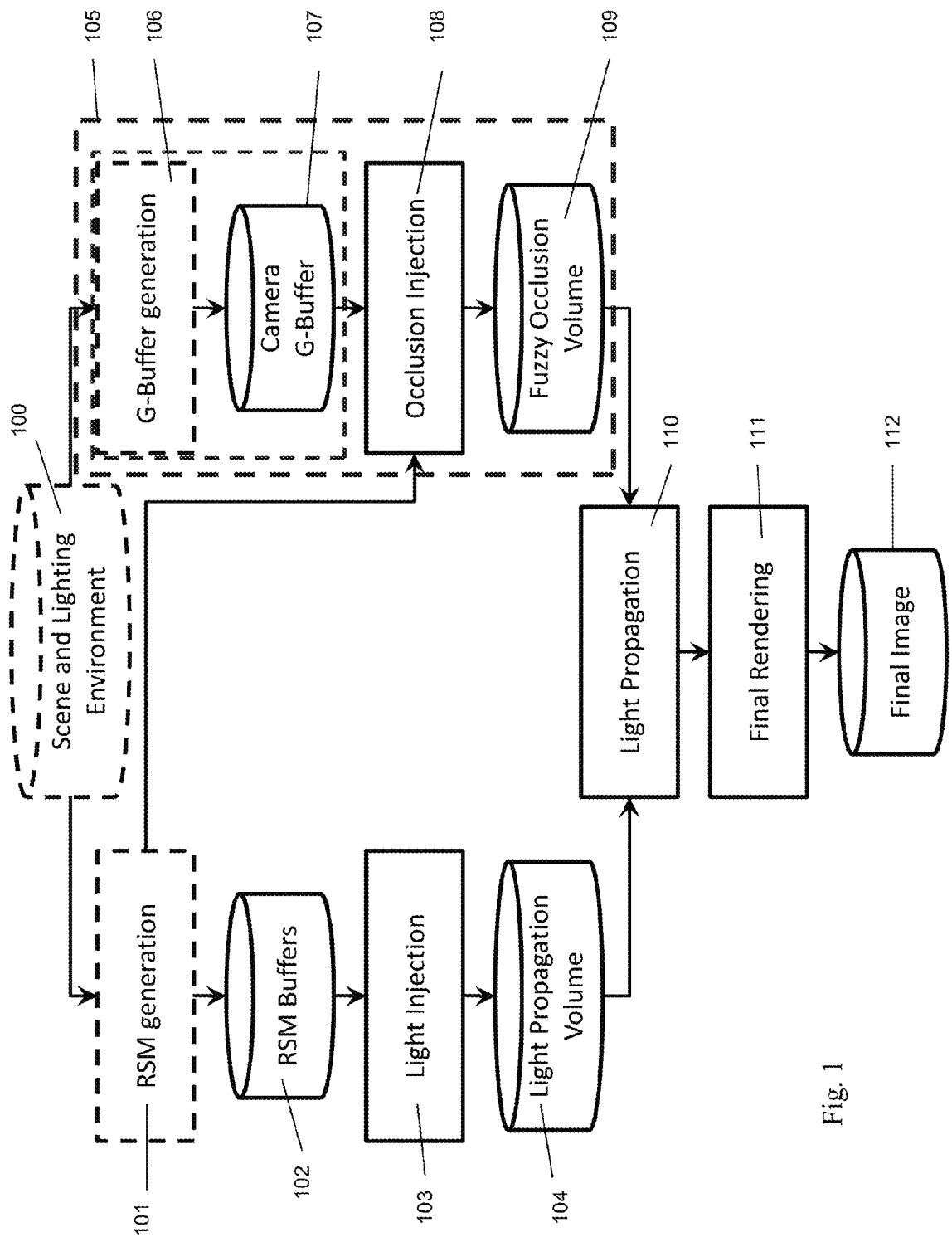
FIG. 1 shows the general system environment of a computer graphics image rendering system according to the present invention for real-time rendering of computer graphics images, including computing means for real-time computing of indirect illumination in a computer graphics image of a scene.

In general the approach according to the present invention is inspired by the discrete ordinate methods and the Lattice-Boltzmann lighting technique (as such there is a conceptual similarity to volume grid radiosity and grid-based fluid advection methods). According to the present invention, the lighting in a scene is sampled and represented on a lattice. This enables to model the light transport using simple, local operations that in turn can be easily parallelized. The computation is based on intensity stored in each cell of this lattice. The contributions taken into consideration include a fast initialization of the lattices for light propagation that can be computed from the scratch for every frame, which is a novel propagation scheme that propagates along the main axial directions (opposed to 26 directions in other schemes) while still providing good results for low-frequency lighting, and a hierarchical approach for handling large scenes.

Prior art grid based methods basically suffer from two major errors. The so-called ray effect stems from the discretization of the directions in which light can travel and causes distracting beams of light. Repeated averaging during the propagation itself further causes light smearing in space. It is evident that such methods—which are typically applied in the domain of participating media—are not well suited for high-frequency (direct) lighting. In contrast, the approach according to the present invention uses the grid-based lighting for low-frequency light only, where these errors are tolerable, especially in the real-time rendering context of our target applications, thus basically following the principles of Ramankutty and Crosbie's modified DOM [1997].

In the following the basic steps of the method according to the present invention are described first. Afterwards, more specific aspects will be described with reference to figures of this application. For this purpose it is assumed in the following that the scene to be computed is embedded into a 3D grid of a fixed resolution (this limitation may be removed by introducing cascaded grids as outlined in the following). According to the present invention, basically two grids used, namely a first grid storing the intensity that is initialized from the surfaces causing indirect lighting or low-frequency direct lighting; and a second grid that stores a volumetric approximation of the scene geometry and is used for fuzzy blocking as the light travels through the scene. Both grids store a spherical function represented as low-frequency second harmonics (SH) approximation. Further improvements to this coarse light propagation volumes will be discussed in section "Results and Discussion" below.

Computing the indirect lighting with the technique according to the present invention comprises basically the four subsequent steps:

Initialization of the light propagation volume (LPV) with the surfaces causing indirect lighting and low-frequency direct light (area light sources).

Sampling of the scene's surfaces using depth peeling from the camera, and multiple reflective shadow maps. This information is used to create a coarse volumetric representation of blocker geometry.

Light propagation starting from the initial LPV and accumulating the intermediate results (yielding the final light distribution).

Lighting the scene geometry using the propagated light computed in the previous step. In addition to directly applying the LPV for diffuse lighting, plausible approximations for glossy indirect lighting and participating media may be included as well, as will be explained below in more detail.

1.1 Initialization of Light Propagation Volume (LPV)

According to the present invention a light propagation volume (hereinafter LPV) is used to compute the low-frequency lighting in a scene only, i.e. mainly the indirect light. The light propagation volume is defined as a three-dimensional grid consisting of a plurality of grid cells, preferably of identical size, in which the propagation of light is iteratively computed, using the result of a previous computational step as the starting value for a subsequent computation of an approximated lighting step. The first step is to transform the surfaces causing the lighting in the scene into the directional intensity representation and initialize the LPV accordingly. Strong direct lighting and shadowing from point or directional light sources is most conveniently computed using traditional techniques such as shadow mapping.

The initialization is based on the idea that one can convert the low-frequency lighting into a set of virtual point lights (VPLs), in the spirit of [Keller 1997]. However, according to the present invention a significantly larger number of VPLs can be used than in typical instant radiosity methods, since we do not compute their contribution individually, but only use them to initialize the LPV. In the following, we will discuss contributions resulting from indirect light and contributions resulting from low-frequency direct light separately. Each of these contributions is accordingly injected in the light propagation volume.

Contributions from Indirect Light

Firstly, a plurality of primary light sources as sources of direct lighting in the scene are defined. For each location in the scene, orientation and color is attributed to surface elements in the scene at these location.

Then, a plurality of secondary light sources (also named hereinafter virtual point lights or VPLs) are defined in the scene, from a light source's point of view, for accounting for indirect lighting by rendering a reflective shadow map (RSM) [Dachsbacher and Stamminger 2005] for every light source. A RSM is an extended shadow map that can be quickly created in a single render pass on the GPU. It captures the directly lit surfaces that cause the first-bounce indirect lighting. Each texture element (texel) of a RSM can be interpreted as a small area light source with a spectral and directional intensity distribution, $I_p(\omega)$, determined by the orientation $n_p$ of the texel and its reflected flux $\Phi_p$:

$$I_p(\omega) = \Phi_p \langle n_p | \omega \rangle_+$$

where $\langle .|.\rangle_{|}$ denotes the dot product with negative values clamped to zero; we omit spectral dependence here for simplicity. For these surfels depth information, orientation information and color information is collected.

The next step is to transform all VPLs into a spherical harmonics (SH) representation and store their contributions in the LPV cells. We can easily determine the cell in which the VPL resides. However, if the VPL points away from that cell's center, we do not want to add its contribution to this cell, but rather to the next cell in order to avoid self lighting and shadowing. For this, we virtually move each VPL by half the cell spacing in the direction of its normal, before determining the cell. In that cell, we only take the orientation of the VPL into consideration, i.e. we ignore its exact positioning inside that cell.

We use spherical harmonics (SH) to represent the directional distribution of intensity. Using n bands of SH yields $n^2$ coefficients, $c_{l,m}$ for the basis functions, $y_{l,m}(\omega)$, both indexed by the band l and degree m with $-l \leq m \leq l$, we can easily derive analytical expressions for the spherical harmonics (SH) coefficients of a clamped cosine-lobe centered around a given direction vector, the VPL normal $n_p$ is this case. A clamped cosine oriented along the z-axis can be expressed in zonal harmonics [Ramamoorthi and Hanrahan 2001], and rotated to the direction $n_p$ [Sloan 2008]. We scale these coefficients by the flux to obtain the SH coefficients for a VPL.

It should be noted that the flux of a VPL already accounts for the area of the pixel from which a VPL has been created. Thus there is no further scaling required, and we can accumulate the intensities, i.e. the coefficients of the SH approximation, in the grid cells. In fact, we use three coefficient vectors to represent RGB data; however, for the explanation of our method we shown only one component.

Every VPL is treated in this way and then "injected" into the LPV. After determining the grid cell we simply accumulate the spherical coefficients of the respective grid cell. It should be noted that this process introduces a spatial discretization of the lighting and inherently assumes that the surfaces causing indirect lighting do not occlude each other inside a single cell.

Contributions from Low-Frequency Direct Light

The second kind of VPL accounts for low-frequency direct lighting from area lights, environment maps and larger groups of point lights, such as those stemming from particle systems. Again, we create a dense sampling, i.e. several hundreds to thousands of VPLs for these light sources, and inject them into the LPV in exactly the same way as those created from RSMs. VPLs from environment maps are injected into the outer layer of the LPV cells; other VPLs outside the grid are omitted.

The result of the LPV initialization pass is a grid of initial intensity distributions that is used to compute the light propagation in the scene. In order to reduce the number of injected VPLs, we also examined clustering similar to the light cuts method [Walter et al. 2005], as an alternative approach. However, the injection pass according to the present invention proved to be very cheap and clustering mostly did not amortize in our experiments.

The afore-mentioned plurality of secondary light sources (VPLs) as allocated to grid cells of the light propagation volume. For this purpose a dedicated mapping is used, which ensures that not only a single VPL is associated to a respective grid cell of the light propagation volume but that at least for some, preferably for all, grid cell(s) of the light propagation volume a plurality of secondary light sources is associated to. Thus approximation significantly reduces the computational power required and is a significant step towards real-time computation according to the present invention. Thus, for initializing the light propagation volume, directional, colored irradiance contributions of all secondary light sources are accumulated (added) in a respective grid cell of the light propagation volume and this step of accumulating directional, colored irradiance contributions of all secondary light sources for all grid cells of said light propagation volume is repeated to thereby finally obtain an initial indirect light intensity distribution in the scene.

1.2 Scene Geometry Injection

In addition to the initial intensity distribution a volumetric representation of the scene's surfaces is created. This coarse approximation of the geometry is used for blocking the light during propagation and thus for computing indirect shadows in the scene.

As it is intended to be capable of computing dynamic scenes without precomputation this information is created on the fly as well. To this end, according to the present invention the sampling of the scene's surfaces that is stored in the depth and normal buffers of the camera view (using a deferred renderer) and in the RSMs is re-used. It should be noted that we typically created RSMs for numerous light sources and thus have a dense sampling of a large portion of the scene's surfaces. If required, we can gather more information by adding depth-peeling passes for the RSMs or the camera view. It is also possible to use a precomputed point sampling of the surfaces, similar to [Ritschel et al. 2008], but this implies additional storage and transformation costs.

Fuzzy Occlusion

Each sample represents a small surface element (surfel) with a given location, orientation, and size. We model the occlusion and assume that we can use the accumulated blocking potential of surfels in a grid cell as a probability for blocking light from a certain direction going through that cell. By this, we can render soft shadows, but surfaces smaller than the grid size, e.g. foliage, do not produce resolved shadows.

The amount of blocking by one of these surfels depends on its size, and on the cosine of the angle between its normal and the light direction in question. The blocking probability of a single surfel with area $A_s$, and normal $n_s$ in a cell of grid size s is thus $B(\omega) = A_s s^{-2} \langle n_s | \omega \rangle_{|}$. It should be noted that for this purpose it is assumed that scene objects are closed surfaces so that a clamped cosine lobe can be used for the blocking probability. This is also because a low-order SH projection of an absolute cosine degrades to a near isotropic function.

Injection

Similar to the VPL injection described above we accumulate the SH projections of the blocking potential into the geometry volume (GV). This accumulation process is correct if there is only one surface intersecting a grid cell as the mutual occlusion of surface samples within a cell cannot be resolved (this is ameliorated by the use of screen-space ambient occlusion; see Sect. 4 below). The GV has the same resolution as the LPV, but is shifted by half a cell, such that its cell centers are located at the corners of the LPV cells to achieve better interpolation of the blocking potential during light propagation.

A surface might be sampled in the camera view and one or more RSMs, and we need to ensure that its blocking is not accumulated multiple times. For this, each buffer is accumulated into a separate GV and after injection the GVs are merged into one GV using a maximum operation on the SH-vectors. As an optimization we can also reuse the surface samples from previous frames (for static geometry), which reduces the cases where surfaces are not captured by the current view or RSMs.

1.3 Propagation Scheme

The inherent idea of grid-based methods, such as DOM, is that light propagation through the scene is computed using successive local iteration steps. In this regard, our method is no exception, but the propagation scheme itself differs and is detailed in this section.

Intensity Propagation

Figure 10E:
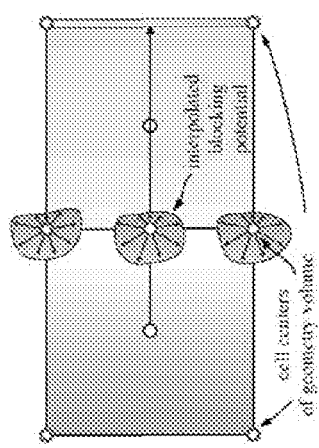
FIG. 10 summarizes further details of computing the propagation of light according to FIG. 9.
Figure 10D:
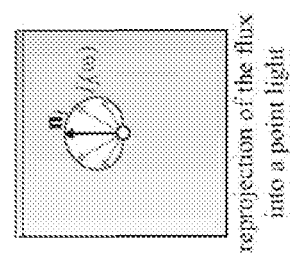
Figure 10C:
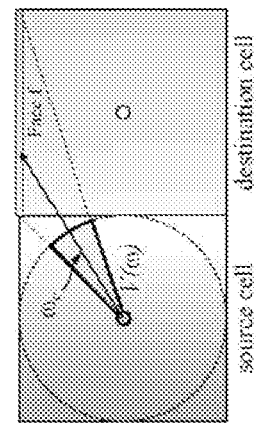
Figures 10A, 10B:
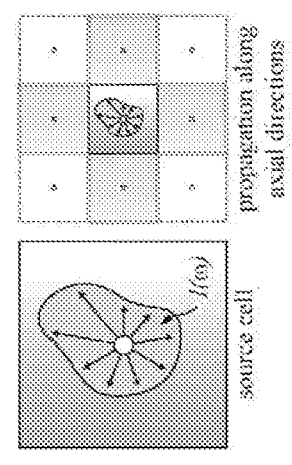

The input for the first iteration step is the initial LPV from the injection stage outlined above. Subsequent iterations of intensity propagation take the LPV from the previous iteration as input. Each cell stores the intensity as a spherical harmonics vector and the light is then propagated to its six neighbors along the axial directions as shown in FIG. 10b, which shows the 2D case with 4 axial directions.

In the following, we describe the propagation from one source to one destination cell only; the propagations along the other directions are computed analogously. If the SH-approximation of the intensity of the source cell is denoted as $$I(\omega) \approx \sum_{l,m} c_{l,m} y_{l,m}(\omega).$$

Next the flux onto each of the faces of the adjacent destination cell is computed. For this purpose we define the visibility function, $V(\omega)$, of a face f with respect to the source cell's center. $V(\omega)=1$ if a ray starting at the source cell center in direction $\omega$ intersects the face, otherwise $V(\omega)=0$. FIG. 10b shows $V(\omega)$ for the top face of the destination cell. The total flux reaching the face can be computed by integrating over directions using $V(\omega)$ as $\Phi_f = \int_\Omega I(\omega) V(\omega) d\omega$.

The faces' visibility functions can be projected into SH yielding a coefficient vector $v_{l,m}$ with $$V(\omega) \approx \sum_{l,m} v_{l,m} y_{l,m}(\omega).$$

The integral over intensity times visibility can then be easily computed using the dot product of the SH-vectors $c_{l,m}$ and $v_{l,m}$. These "transfer vectors" $v_{l,m}$ can be precomputed once and stored for the propagation scheme. The problem, however, is that the integral value can be very inaccurate for low-order SH approximations, and according to the present invention preferably a different strategy is used for this case. Instead of a transfer vector the solid angle $\Delta\omega_f = \int_\Omega V(\omega) d\omega$ of each face in the destination cell is computed and the central direction $\omega_c$ of the visibility cone is then determined. The flux reaching the face is then computed as $$\Delta\omega_f / (4\pi) \cdot I(\omega_c).$$

Effectively this means that we take the intensity in direction $\omega_c$ as average intensity over the solid angle.

Reprojection

Using this propagation we obtain the incident flux for each face of a destination cell and then transform it into outgoing intensity for the subsequent propagation again. For this we compute the intensity of a new point light source (with the same emission characteristics as our VPLs) at the destination cell's center pointing towards the face and causing exactly as much flux as the face received due to the propagation. That is, the flux on the face, $\Phi f$, is equal to the total emitted flux of the point light:

$$\Phi_f = \int_\Omega \Phi_l \langle n_l, \omega \rangle_| d\omega,$$

and thus $\Phi_l = \Phi_f/\pi$. Similar to the light injection stage, we scale the clamped cosine lobe by $\Phi_l$ and accumulate the SH coefficients, for the new point light located at the cell's center, in the destination cell for the next iteration.

The propagation is computed for each source cell and each of its adjacent cell's faces (shown yellow in FIG. 10b). It should be noted that this process conserves energy that is expected from light propagation in vacuum. However, the propagation together with the reprojection introduces spatial and directional discretization. It should, however, also be noted that this is common to all lattice-based methods. The propagation scheme according to the present invention in flatland is compared to a reference solution and DOMs in Sect. 2 hereinafter.

Blocking

We also need to integrate the blocking of light due to scene geometry into the propagation step. In the geometry injection stage we computed the GV from the surfaces in the scene that stores anisotropic occlusion probabilities for exactly this purpose. The GV is displaced by half the grid size with respect to the LPV. By this, a cell center of the GV resides on a corner of an LPV cell. Whenever we propagate from a source to a destination cell, we bilinearly interpolate the GV's SH-coefficients at the center of the face through which we propagate, and evaluate the occlusion for the propagation direction to attenuate the intensity. Note that we do not consider this occlusion in the very first propagation step after injection in order to prevent self-shadowing.

Iterations

The result after computing all propagations in the LPV is accumulated in a separate 3D grid after each iteration: the sum of all intermediate results is the final light distribution in the scene. The number of required iterations depend on the resolution of the grid. Similar to [Geist et al. 2004] we use two times the longest side of the LPV iterations as a heuristic for the scheme as described above. Obviously this is not feasible for our real-time requirements for reasonably sized LPVs. The multi-resolution scheme introduced in Sect. 2 below yields similar results with less iterations.

Obviously there is inherently strong blurring caused by the propagation scheme. However, since we use this method for indirect light only, the results—especially for low-band SH approximations that we use for real-time rendering—are of sufficient quality and can be computed very efficiently (discussed in Sect. 2 and 4 below).

1.4 Using the Light Propagation Volume for Rendering

The accumulated results of all iterations represent the light distribution in the scene. In the simplest form we query the intensity by a tri-linearly interpolated lookup of the SH coefficients. We then evaluate the intensity function for the negative orientation of the surface, similar to irradiance volumes [Greger et al. 1998; Oat 2006]. However, since we store intensity we need to convert it into incident radiance and due to spatial discretization we assume that the distance between the cell's center (where the intensity is assumed to be), and the surface to be lit is half the grid size s.

Figure 11B:
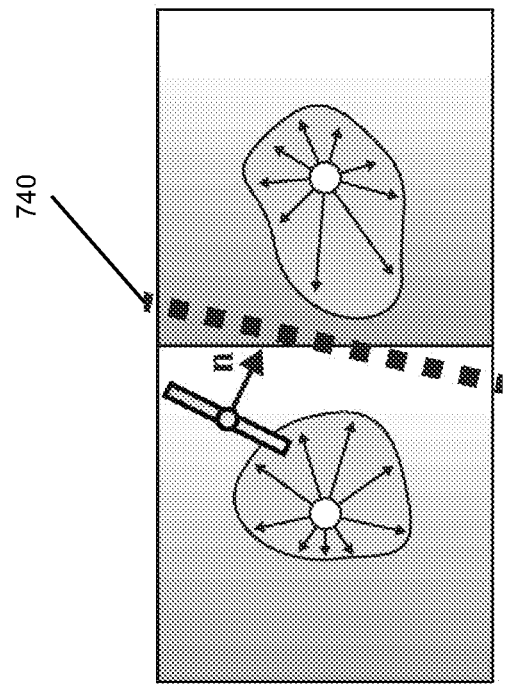
FIGS. 11a and 11b show intensity distributions that can result from occluding objects (indicated by dashed lines) disposed between neighboring grid cells in the light propagation volume.
Figure 11A:
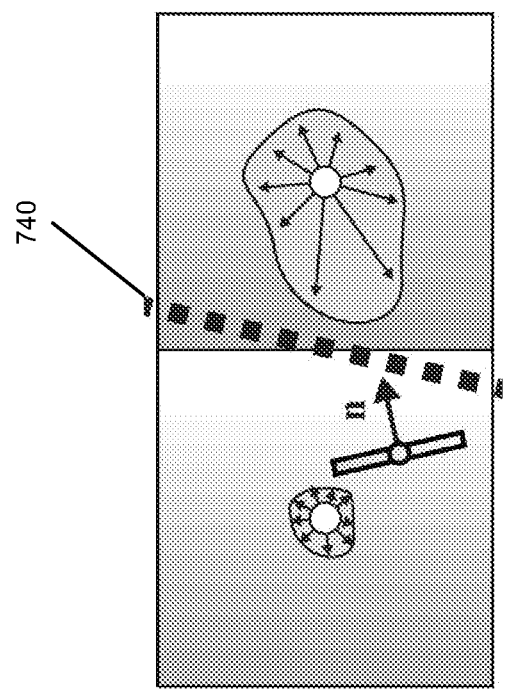

One problem of coarse volumes paired with low-frequency approximations of the lighting is self-illumination and light-bleeding. We found that a dampening factor based on the directional derivative of the intensity distribution greatly reduces these artifacts. For a surface location x and normal n, we determine the tri-linearly interpolated SH coefficients $c_{l,m}$ and the directional derivative in normal direction $\nabla_n c_{l,m}$ (computed via differencing). Whenever the derivative is large, and $c_{l,m}$ and $\nabla_n c_{l,m}$ are deviating, we dampen $c_{l,m}$ before computing the lighting (FIGS. 11a and 11b shows two such typical situations).

2 Cascaded Light Propagation Volumes

Using a single LPV to compute the light propagation in an entire scene (with acceptable resolution) would require a very large grid. Instead we use a set of nested grids moving with the viewer (FIG. 4), similar to geometry clipmaps [Losasso and Hoppe 2004] but in 3D. The grids are not exactly centered around the viewer, but displaced into the view direction. This provides high spatial resolution in parts of the scene close to the camera, and also covers distant parts with lower resolution. The nested grid approach allows us to use grids of smaller size (typically $32^3$ cells) and thus reduce the number of required propagation iterations.

2.1 Nested Grid Propagation

Our method as described in Sect. 1 remains largely unchanged. VPLs and geometry are injected into all nested grids at the same time. However, if the size of an object (determined using its bounding box) is smaller than the cell size of a grid, we do not create VPLs from this object by not rendering it to the RSM. This is to prevent aliasing artifacts (see next section).

Light propagation is computed for all grids independently. Note that VPLs in a fine grid have also been injected into the coarser grids (green cells in FIG. 4). This ensures that indirect light from nearby objects bleeds into distant parts of the scene. When using the LPVs for lighting, we look up the finest grid at the respective location. At the boundary of a fine grid we create a smooth transition to the next-coarser grid by interpolation between both levels (similar to [Losasso and Hoppe 2004]). Note that the indirect light due to VPLs that have been injected into a coarser grid (but not into finer grids) is cut-off due to that blending. We did not, however, experience distracting or even visible artifacts from this cut-off.

2.2 Coherent Solutions in Dynamic Scenes

Providing a stable solution under object, camera, and light movement is very important for interactive applications. The primary cause for potentially inconsistent light propagation stems from the spatial discretization in the LPV. To prevent this, we snap the cascaded LPVs—that move with the camera—to multiples of the grid size. By this "one-cell grid snapping" we maintain a consistent VPL and geometry injection under camera movement.

The second source of inconsistency—in other algorithms often causing flickering—is the sampling of light emitting and reflecting surfaces. As we can afford to excessively sample these surfaces and inject a huge number of VPLs (several hundred thousand), there is a high redundancy of light emitters in the LPV. In contrast to other methods, such as instant radiosity based methods, this redundancy allows the rendering of indirect illumination from moving and complex, detailed objects, even such as foliage, without flickering.

However, we noticed that small moving objects—if their size is below the grid cell size—can cause artifacts in the form of unsteady moving indirect lighting. In this case the spatial discretization of the LPVs becomes noticeable. As an ad-hoc solution, we fade out the VPLs from such objects. This solution seems tolerable as the lower grid resolutions are further away from the camera.

3 Qualitative Evaluation of the Propagation

Figure 12:
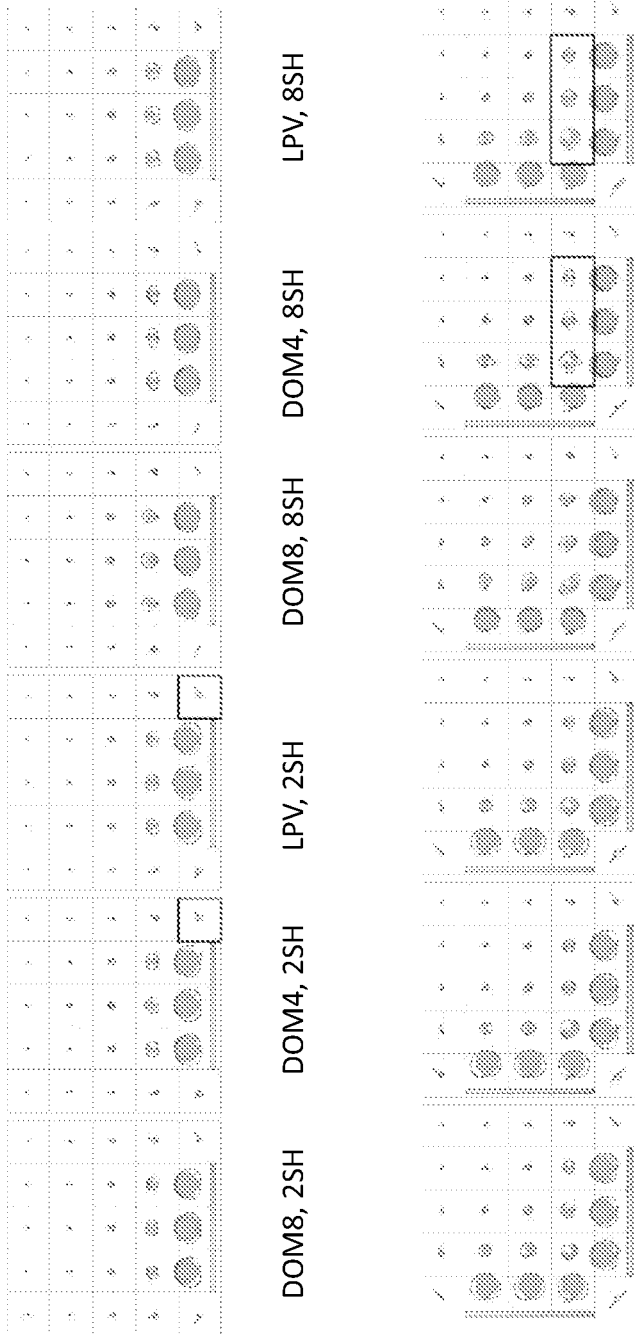
FIG. 12 compares the results of light propagation in two simple settings with one and two area light sources computed analytically (shown in gray), using the standard discrete ordinate method (DOM) propagation to all eight neighbor cells (shown in green) and the method according to the present invention (shown in red), which is based propagation of light in the light propagation volume.
Figures 13A, 13B:
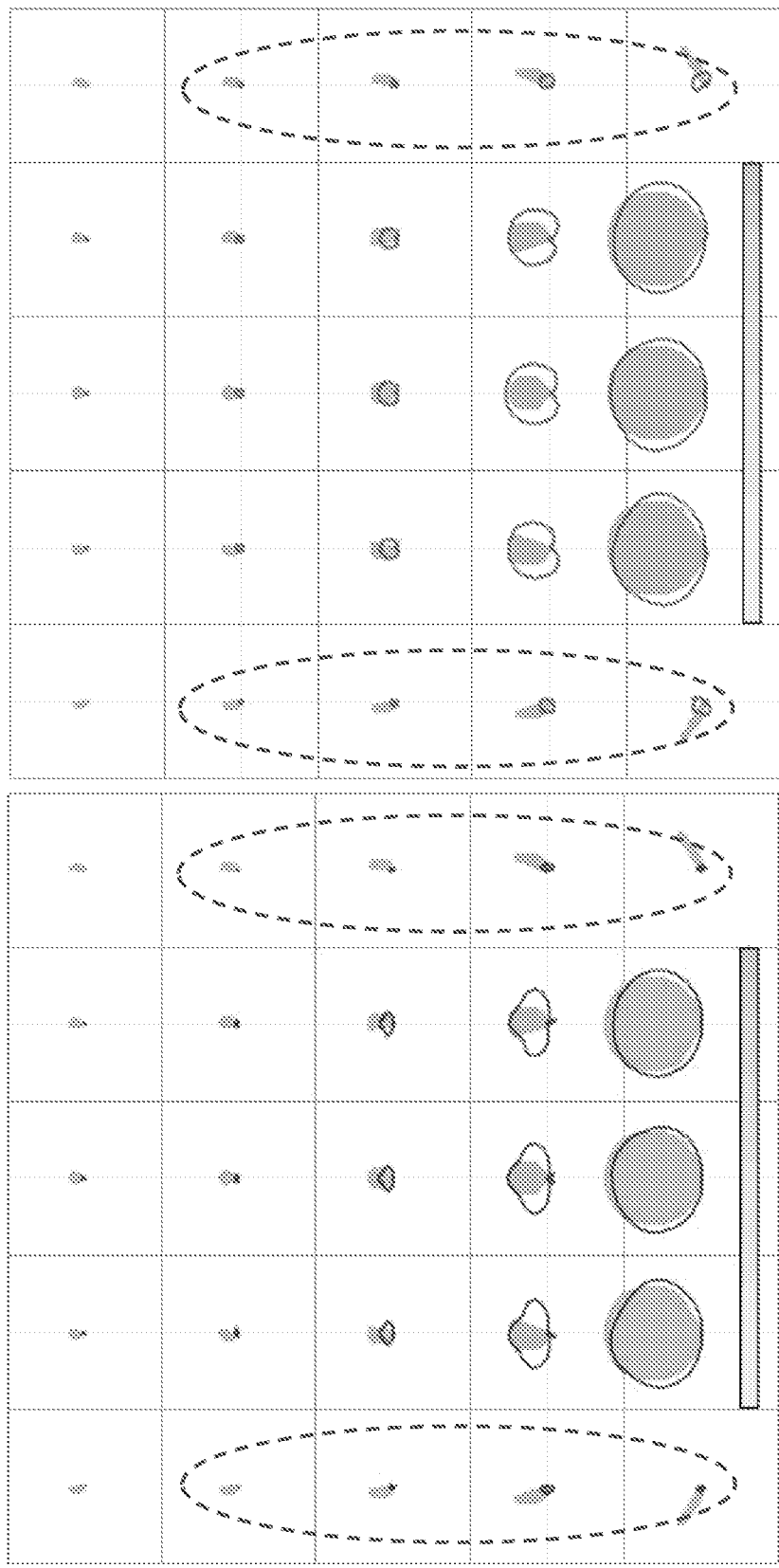
FIGS. 13a and 13b compare the results of spherical harmonics DOM method used for global illumination computations inside participating media and the method according to the present invention.

We show flatland (2D) scenes to discuss the deviations and approximation errors due to our propagation scheme. FIG. 12 plots light propagation in two simple settings with 1 and 2 area light sources computed analytically (gray), using the standard DOM propagation to all 8 neighbor cells (DOM8, green), and our method (LPV, red). For comparison, we also include a modified DOM scheme (DOM4, blue) that propagates to the main axial directions only, similar to ours, to demonstrate the effectiveness of computing the flux per face compared to a center-to-center transfer.

We observe that for few SH bands, all three yield comparable results with expectedly blurred intensity distributions. The LPV scheme according to the present invention preserves the main intensity directions better than DOM4, e.g. light leaving at grazing angles (highlighted cells in top row), but obviously is blurry as well. For more SH bands, DOM4 produces very strong ray effects, whereas the LPV scheme according to the present invention produces no such artifacts (highlighted in bottom row). However, DOM8 preserves distribution much better. This leads us to the conclusion that our scheme is well-suited for few SH bands (2 to 4) and large light sources (larger than 1 cell). In these cases it yields good approximations, preserves the main direction of light transport well, and only requires 4 (6 in 3D) neighbor cells for propagation compared to 8 (26 in 3D) for DOM8.

3—Implementation Details

The method according to the present invention has been integrated into the applicant's CryENGINE® 3: a multi-platform (DirectX 9 and 10 on PC, Sony PS3® and Microsoft Xbox 360®) real-time rendering engine. Due to the performance requirements the implementation uses only 2 SH-bands (4 coefficients) per color channel for the LPV. The cascade consists of 3 grids, each stored as three RGBA 16-bit floating point textures of size $32^3$ (QUVW8 format, i.e. 8-bit signed integer per component, on consoles). The geometry volume is of the same format and resolution as the LPV (but with only one texture and no spectral data), and the surfels are created from the depth and normal buffers of the camera view and RSMs. High-resolution buffers, e.g. the camera view, are down-sampled prior to the surfel injection.

The RSMs store a depth buffer (32-bit float), and normals and flux (RGBA 8-bit each) of size $256^2$ ($128^2$ for consoles). This amounts to $2^{16}$, or $2^{14}$, VPLs per primary light source. The VPLs are injected into the LPV cascade using point rendering. This requires either vertex texture fetches (used for DirectX 9/10, and Xbox 360), or rendering to vertex buffer (faster on the PS3).

For the light propagation a GPU-friendly gathering procedure with ping-pong rendering is performed: for every cell (in every cascade) we look up the intensity distributions of the six neighbor cells. We then compute the flux onto the faces, reproject the flux and accumulate the output in a render target. In most scenes eight iterations provided visually pleasing results. It is noted that this limits the distance of light propagation and might produce artifacts in large, sparse scenes. The GPU memory required for the method according to the present invention (including ping-pong render targets) is $32^3 \times (2 \times 4) \times 3 \times (\#\text{cascades}+2)=3.75$ MB for the light propagation volume (LPV) and $32^3 \times (2 \times 4) \times \#\text{cascades}=0.75$ MB for the GV (for the consoles the memory is halved due to the QUVW8 format). Note that storing spectral reflectivity would triple the GV memory and bandwidth; in our examples with multiple bounces we used monochromatic reflection for further bounces only. The following Table 1 shows detailed timings for these settings.

TABLE 1

Figure 16:
FIGS. 16a-16d show a comparison for a diffuse scene rendered with long computation time and high resolution as compared to the same diffuse scene rendered with a method according to the present invention computed in real-time and high resolution.

Detailed timings for the scene shown in FIG. 16 in milliseconds for the individual stages (for one $32^3$ LPV grid and 8 iterations).

| | | | |
|---|---|---|---|
| RSM rendering | 0.16 | 0.5 | 0.8 |
| VPL Injection | 0.05 | 0.2 | 0.4 |
| | 0.02 | 0.15 | 0.15 |
| Propagation | 0.8/1.1/1.4 | 0.8/1.1/1.5 | 0.7/1.1/1.5 |
| LPV Lookup | 2.4 | 2.0 | 1.5 |
| Total | 3.4/3.7/4.0 | 3.5/3.8/4.2 | 3.4/3.8/4.2 |

The three timings for the propagation step refer to: no occlusion, fuzzy occlusion, fuzzy occlusion and multiple bounces. It should be noted that only the cost of the RSM rendering depends on the scene complexity (All measurements at 1280 x 720 resolution (no MSAA), and RSM size of $256^2$ (=number of injected VPLs) for NVIDIA GTX285 and $128^2$ for consoles)

4. Results and Discussion

Obviously the method according to the present invention computes a low-frequency approximation to the indirect lighting in a scene only. All high-frequency variations, i.e. surface details, should be achieved using bump mapping and screen-space ambient occlusion. The results indicate that the method according to the present invention produces plausible renderings (the indirect light is exaggerated for illustration purposes) in many scenarios. FIG. 16 shows a comparison to ground-truth for two exemplary diffuse scenes. While the scenes of FIGS. 16a and 16c serve as reference images that have been computed with high accuracy requiring high computing power using a conventional method, the two scenes shown in FIGS. 16b and 16d, respectively, show the same image computed in real-time using the method according to the present invention. The inserts indicate the computing time required (42 minutes and 45 minutes, respectively, for FIGS. 16a and 16c, respectively) and the computing platform on which the computation was performed (NVIDIA GTX285). Thus, the images according to FIGS. 16b and 16d, respectively, have been computed at a image repetition rate of 78 fps (frames per second) and 60 fps, respectively.

It can be noted that the images overall compare well. However, occlusion from nearby geometry in the LPV rendering is approximated by ambient occlusion and shows differences to the photon mapping image. All LPV renderings have been captured at 1280×720 resolution on an NVIDIA GeForce GTX 285.

In the following further rendering techniques using the LPV will be described, followed by a discussion of benefits and limitations.

Multiple Indirect Bounces

The propagation step can be easily modified to account for (coarsely approximated) multiple diffuse bounces of indirect light. When propagating from a source to a destination cell, we perform an additional lookup into the geometry volume (GV) with an offset of one cell into propagation direction, as shown in FIG. 10e). This yields a blocker approximation $B(\omega)$ that can be used to immediately reflect the light that is propagated to the destination cell. Thus the diffuse illumination of the blocker geometry can be estimated as $B(-\omega_c)$ (effectively computing the dot product of the incident light direction $-\omega_c$ and the surface normal), scaled by the propagated intensity and the reflectivity of the blocker geometry. The reflected light has the same directional distribution as the diffuse blocker geometry, and thus $B(\omega)$ can be scaled by the reflected intensity and injected into the destination cell. It should be noted that for this purpose it is only necessary to modify the propagation step causing an additional cost of approximately 0.3 ms on an NVIDIA GeForce GTX 285 for a $32^3$ LPV and 8 iterations; all other steps remain unchanged.

Glossy Reflections

Figure 10F:
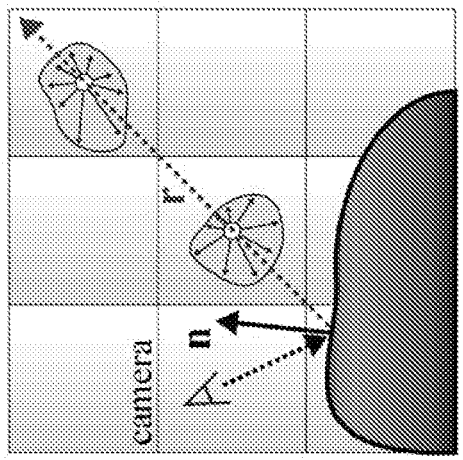
Figure 10E:
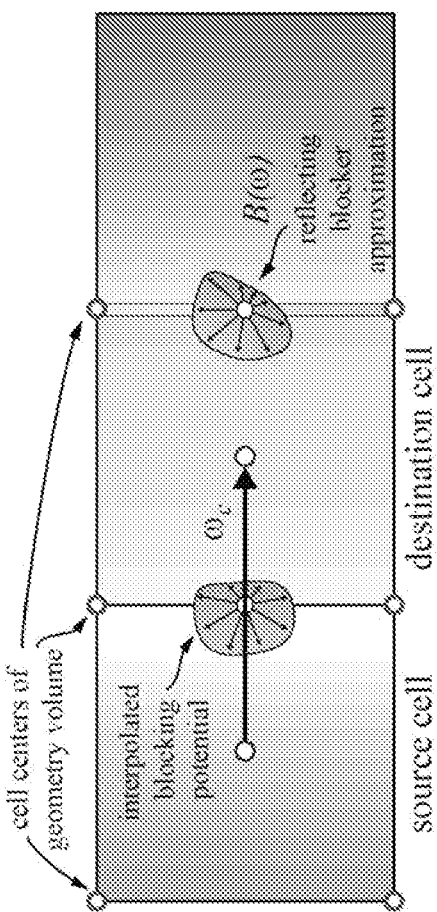

Obviously the propagation scheme according to the present invention causes strong blurring of the propagated light. However, the LPVs can be used to gather incident light for rendering glossy surfaces, as shown in FIG. 10f. The idea is to compute the incident light from the reflection direction r by marching through the LPV and averaging the intensity I(−r) of all cells, divided by the squared distance to the cell that we pass through; in practice four cells proved to be sufficient. This procedure can be interpreted as going back in propagation time (because light is sampled that has not been propagated thus far), and one can look up the intensity distributions before they get smeared out further. The lookup into multiple cells smoothes the estimate and prevents artifacts, such as discontinuities, in the glossy reflections.

Participating Media

We can also use the LPVs to render plausible effects of single-scattering participating media (see teaser). For this we perform a final render pass and ray march through the cascade of LPVs and accumulate the inscattered light assuming an isotropic phase function. Strictly speaking, adding inscattered light generates energy, and we need to attenuate light during propagation. The step size is proportional to the grids' cell size, i.e. we use larger steps in coarse volumes, and smaller steps close to the camera. In the teaser we show an example rendering with homogeneous media; the rendering cost increased by 18 ms for the ray marching with a ray marching step size equal to the LPV grid cell size. Note that we can also plausibly render non-homogeneous media when using a volume texture to store scattering coefficients.

Discussion

The main advantages of the method according to the present invention are the low cost and that it produces stable and flicker-free renderings. The latter is achieved with the high sampling of the surfaces using RSMs and the VPL injection. An insufficient RSM resolution can cause flickering. Fortunately, creating RSMs and injection make up a small fraction of the rendering cost only. Thus the method according to the present invention can be used to handle fully dynamic scenes including those with "intricate" geometry, such as foliage and fences (see comparison according to FIG. 14, showing the same scene for two different computation schemes). The limitations of the method according to the present invention are obvious as well: firstly, the spatial discretization might be visible as light bleeding; this is somewhat reduced by the cascaded approach outlined above. Secondly, due to the SH representation of the intensity and the propagation, the light strongly diffuses and is not propagated strictly straight ahead, and there is no reasonable chance of handling glossy surfaces during propagation. As regards the impact of the number of propagation iterations, the cascaded approach reduces the computation cost in large scenes which would otherwise require high resolution grids (the cost is linear in the number of iterations and grid cells). Lastly, caution must be exercised to make sure that geometry causing indirect light or blocking is sampled by RSMs or the camera view to inject the respective data into the grids.

Embodiment 1

While the general principles of the method according to the present invention have been set forth in the foregoing below specific details of an exemplary embodiment will be described. It is noted, however, that the description below shall not be construed to delimit the present invention only to what is disclosed in the following.

FIG. 1 shows the general system environment of a computer graphics image rendering system according to the present invention for real-time rendering of computer graphics images, including computing means for real-time computing of indirect illumination in a computer graphics image of a scene. Reference numeral 100 designates a functional block in charge of triggering scene and lighting environment, e.g. in response to movements or panning of a camera's point of view in a computer graphics scene, such as a scene of a computer or video game. The right-hand part of FIG. 1 generally relates to the generation of depth and related information of the scene to be rendered. Reference numeral 106 designates generation of a G-Buffer (geometric buffer). There are many attributes that can be used in a G-buffer. The simplest ones come from the standard graphics pipeline itself; for example, G-buffer attributes can store color, alpha, depth, texture coordinates, or the normal per fragment of the image space. Other typical G-buffer attributes can be object ID, world-space position, screen-space position, or parameterization of higher-order surfaces. Additionally, further attributes might be implemented such as the screen-space velocity for motion blur effects or light-space depth values for shadow calculations. Most of these attributes are computed in object space and stored for each fragment of the image plane. The subsequent rendering passes, referred to as G-buffer operations, receive this information and have therefore access to more than only simple 2D color information. Reference numeral 107 designates a camera g-buffer receiving information from g-buffer generation unit 106 for the respective camera position. As indicated by the dashed line encircling both units 106 and 107, the buffer data may be derived (obtained) from any other buffer configured for storing information about depths and normals in the scene to be rendered, including from reflective shadow maps (RSM).

In the left-hand part of FIG. 1 reference numeral 101 designates a reflective shadow map generation unit, the result of which is output to a RSM buffer unit 102, which may be configured for storing multiple RSMs. It should be noted that RSMs are typically created for numerous light sources so that a dense sampling of a large portion of the scene's surfaces can be implemented. As outlined above, a high number of virtual point light sources (VPLs), which may be of the order of 30,000 to 100,000, are assumed for the scene to be rendered (block 103) and propagation of light from each of these VPLs in the scene is computed using an approximation, however, which is to reduce computing time significantly. For this purpose the VPLs are mapped onto the grid cells of the light propagation volume while their contributions are accumulated for the respective grid cell, using the light injection block 103 and the light propagation volume buffer 104. Light propagation in the light propagation volume is computed by means of the light propagation unit 110, the output of which is output to the final rendering unit 111, which outputs the final image 112.

As shown in the right-hand part of FIG. 1, the system further comprises an occlusion injection unit 108 and a fuzzy occlusion volume unit 109, outputting information about occluding objects in the scene to the light propagation volume unit 110 and the final rendering unit 111.

As will become apparent for the person skilled in the art upon study of the foregoing, a computing environment for performing the method and approach according to the present application may have additional features. For example, the computing environment includes storage, one or more input devices, one or more output devices, and one or more communication connections. An interconnection mechanism (not shown) such as a bus, controller, or network interconnects the components of the computing environment. Typically, operating system software (not shown) provides an operating environment for other software executing in the computing environment, and coordinates activities of the components of the computing environment. As already mentioned, the computing environment desirably includes graphics processing hardware and software, such as the DirectX® application programming interface and OpenGL® graphics interface function libraries, and ATI Radeon® or NVidia GeForce® graphics processing unit-based video cards.

The storage may be removable or non-removable, and includes magnetic disks, magnetic tapes or cassettes, CD-ROMs, CD-RWs, DVDs, or any other medium which can be used to store information and which can be accessed within the computing environment. The storage stores instructions for the software implementing the image rendering system (shown in FIG. 1 and explained in the following article).

The input device(s) may be a touch input device such as a keyboard, mouse, pen, or trackball, a voice input device, a scanning device, or another device that provides input to the computing environment. For audio, the input device(s) may be a sound card or similar device that accepts audio input in analog or digital form. The output device(s) may be a display, printer, speaker, or another device that provides output from the computing environment.

The communication connection(s) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Figure 2:
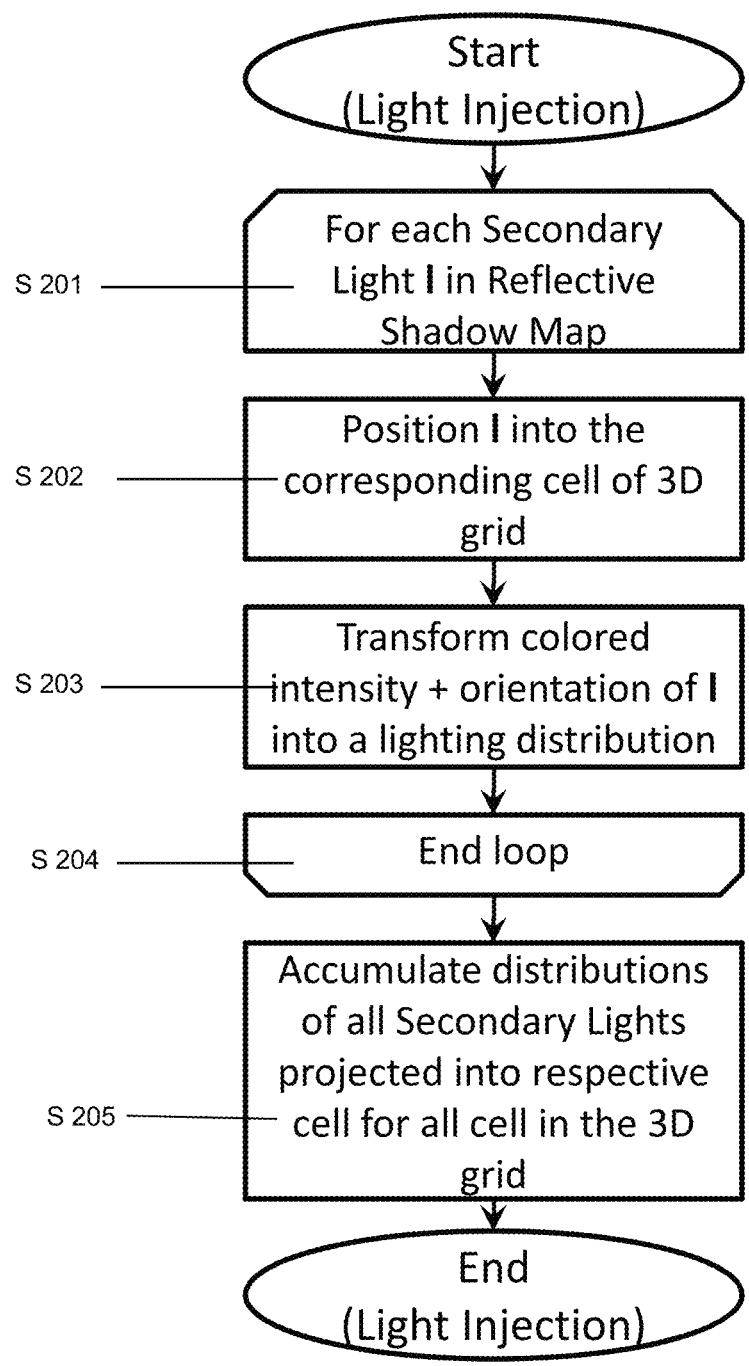
FIG. 2 illustrates in a schematic flow diagram a step of allocating a plurality of secondary light sources to grid cells of a light propagation volume and accumulating directional, colored irradiance contributions of all secondary light sources in a respective grid cell and for all grid cells of the light propagation volume (light injection) in a method for real-time computing of indirect illumination in a computer graphics image of a scene according to the present invention.

FIG. 2 illustrates in a schematic flow diagram a step of allocating a plurality of secondary light sources to grid cells of a light propagation volume and accumulating directional, colored irradiance contributions of all secondary light sources in a respective grid cell and for all grid cells of the light propagation volume (light injection) in a method according to the present invention. More specifically, the step of light injection according to FIG. 2 comprises a loop designated by reference numeral S201 which extends over all secondary light source with light intensity I in the respective reflective shadow map of the scene. In step S202 this light intensity I is position into the corresponding grid cell of the 3D grid of the light propagating volume. In step S203 the colored intensity and the orientation of the light intensity is transformed into a lighting distribution. Performing the steps S202-2203 over all secondary light sources in the reflective shadow map finally yields a distribution of secondary light sources over the scene to be rendered. These secondary light sources are mapped (projected) onto the grid cells of the light propagation volume. In step S205 for all cells in the 3D grid of the light propagation volume the light intensity distributions of the associated secondary light sources are accumulated, i.e. summed up, which then terminates the step of light injection. Light injection is performed based on information from the RSM buffer and results in an initial indirect light intensity on the basis of which light propagation is computed using the method steps of FIG. 3. Due to the mapping (projection) the step of light injection can be performed at significantly reduced computing time, which enables real-time computing of indirect lighting even in complex scenes.

Figure 3:
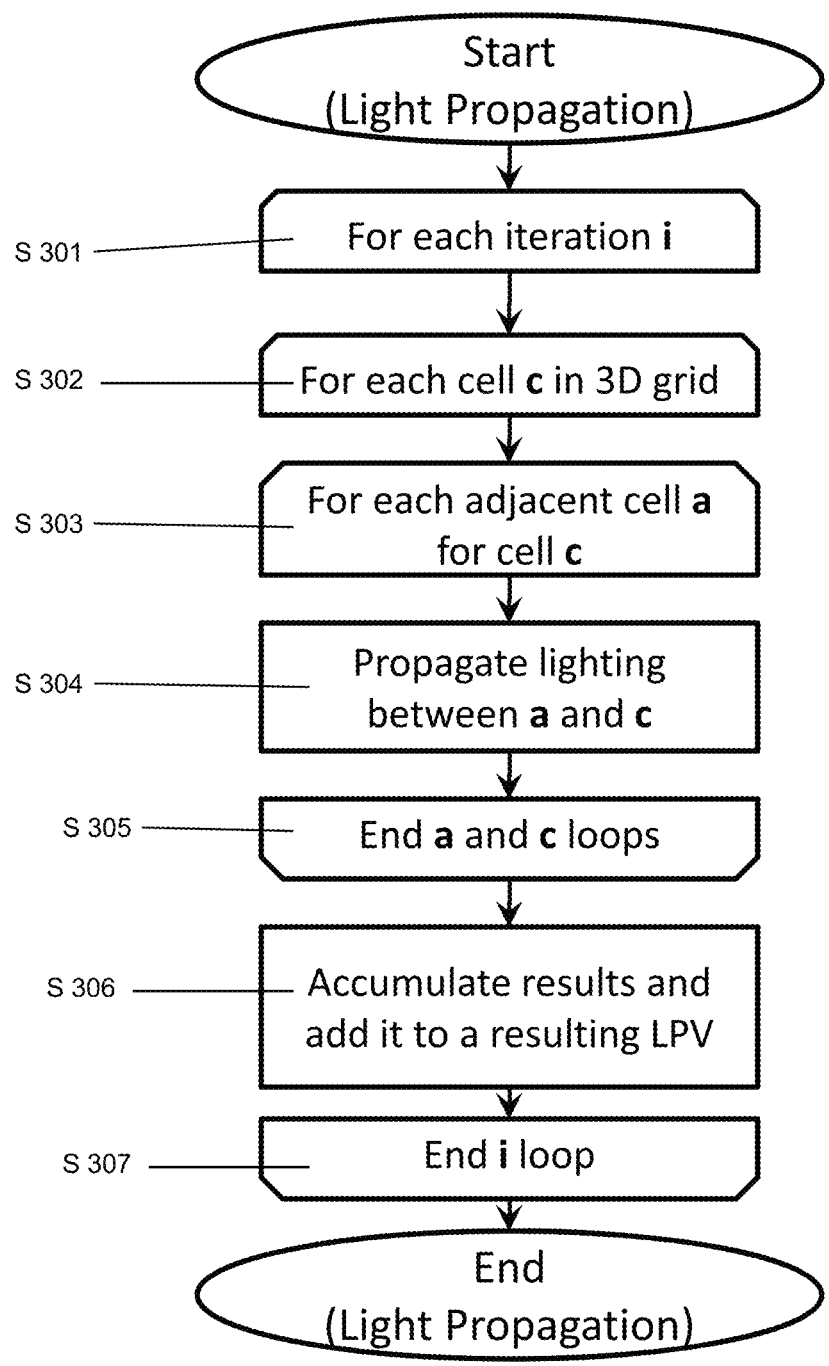
FIG. 3 illustrates in a schematic flow diagram a step of iteratively computing the propagation of light in the light propagation volume starting with the initial indirect light intensity (light propagation) in a method for real-time computing of indirect illumination in a computer graphics image of a scene according to the present invention.

FIG. 3 illustrates in a schematic flow diagram a step of iteratively computing the propagation of light in the light propagation volume starting with the initial indirect light intensity (light propagation) in a method according to the present invention. The kernel (S 304) of this step computers the propagation of lighting between neighboring grid cells a and c in the 3D grid of the light propagation volume. This step S304 is performed for each adjacent cells a for a given grid cell c (loop S302/S305) and is iteratively performed for each iteration step I (S301). The results of these steps are accumulated and added to a resulting light propagation volume (S306), which is then used as the initial lighting for a subsequent iteration step. The process is terminated if performed for all iteration steps I (S307).

Figure 4:
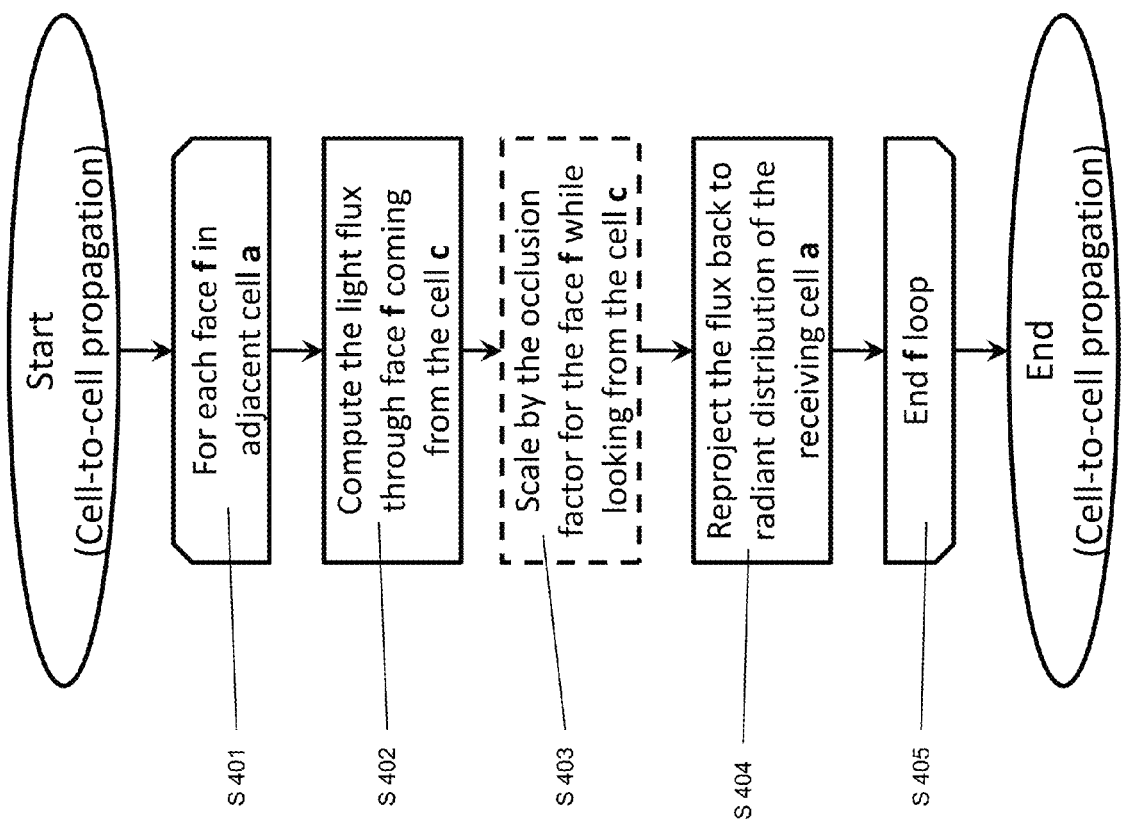
FIG. 4 illustrates in a schematic flow diagram the cell-to-cell-propagation of light in the light propagation step shown in FIG. 3.

Details of step S304 are shown in FIG. 4 which illustrates in a schematic flow diagram the cell-to-cell-propagation of light in the light propagation step shown in FIG. 3. This step comprises a loop (S401, S405) and is hence executed for each face f in an adjacent grid cell a. In step S402 the light flux coming from the grid cell c and passing through face f of the respective adjacent grid cell a is computed. In step S403 the result is scaled by the occlusion factor for the face f while looking from cell c. In step S404 the resulting flux is reprojected back to the radiant distribution of the receiving grid cell a. Finally, when the last face in the adjacent cell a is reached, the loop terminates (S405). It should be noted that method step S403 is optional and depends on whether fuzzy occlusion (see above) is used or not. The details of this method step S403 are shown in FIG. 5. it should be noted that the whole process is symmetric for cells c and a in general, so that it doesn't matter if c and a are exchanged with each other in this diagram.

Figure 5:
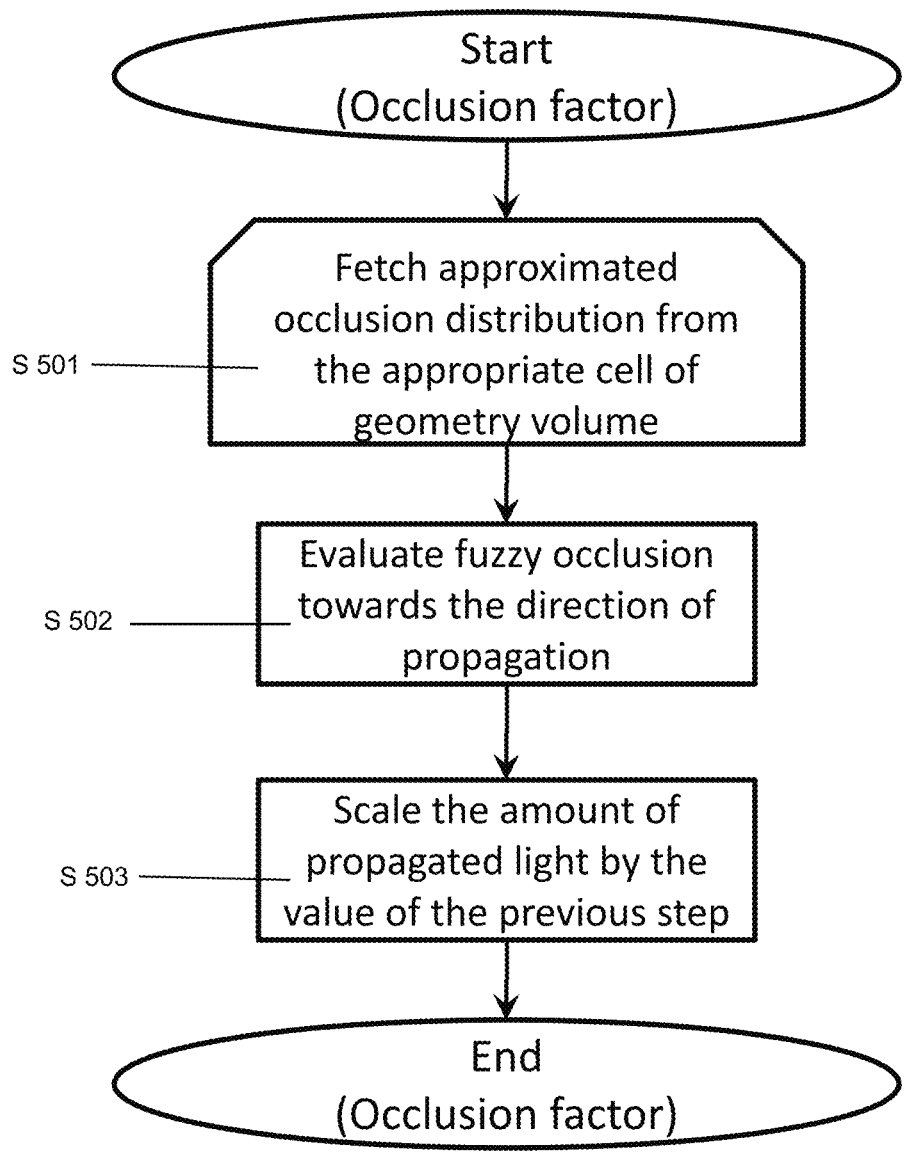
FIG. 5 illustrates in a schematic flow diagram a step of scaling the light intensity propagated into an adjacent cell in the cell-to-cell-propagation of light according to FIG. 4.

FIG. 5 illustrates in a schematic flow diagram a step of scaling the light intensity propagated into an adjacent cell in the cell-to-cell-propagation of light according to FIG. 4 if fuzzy occlusion is performed. In step S501 approximated occlusion distribution is fetched from the appropriate cell of the GV (geometry volume). In step S502 the fuzzy occlusion towards the direction of propagation is evaluated and the resulting amount of propagated light is scaled in step S503 by the value of the previous step.

Figure 6:
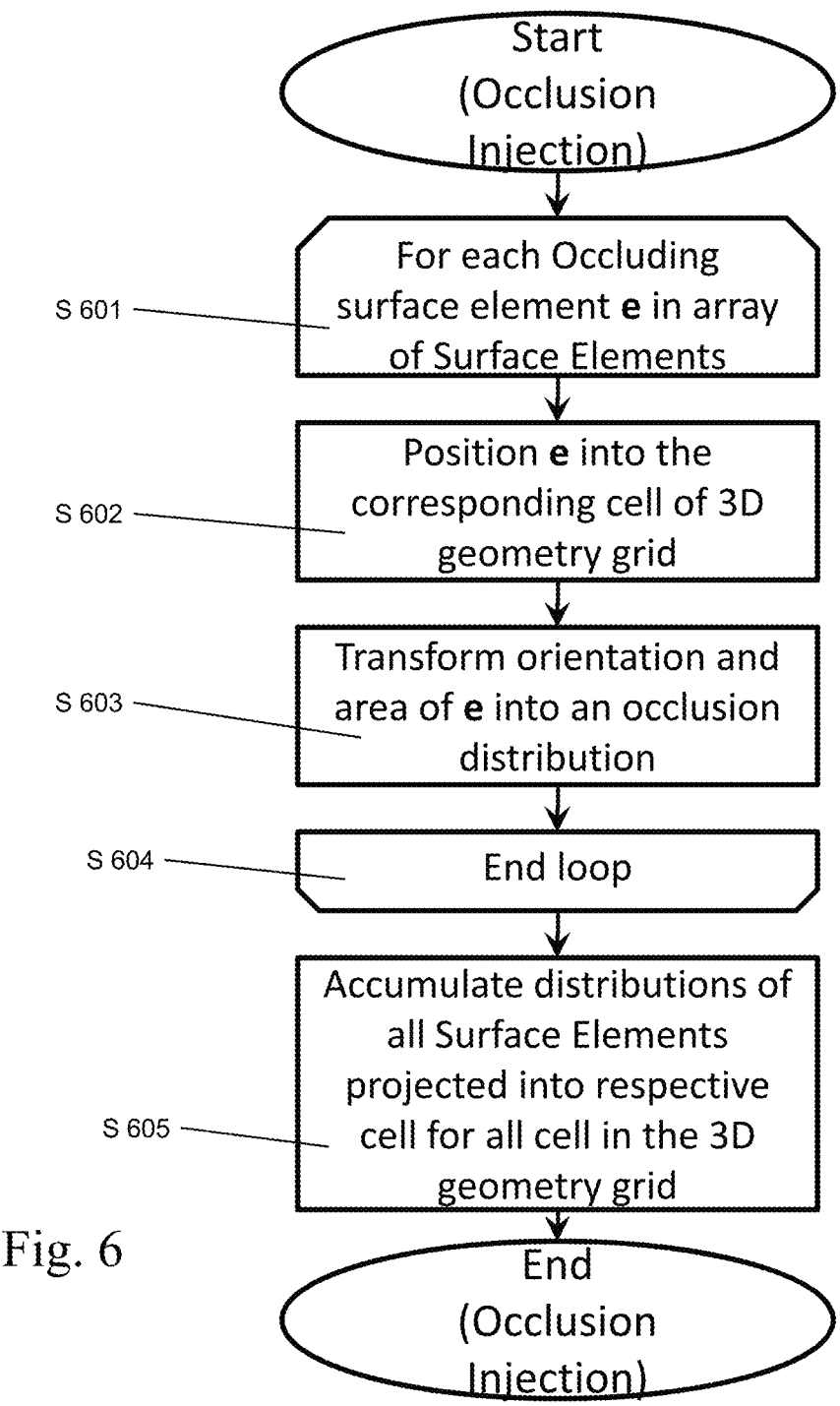
FIG. 6 illustrates in a schematic flow diagram a step of computing the contributions of occluding surface elements in the light propagation method step shown in FIG. 3.

The steps of occlusion injection are summarized in FIG. 6 and is performed for each occluding surface element (surfel) e in the array of surfels prevailing in the scene to be rendered (S601/S604). In step S602 the surfel e is positioned into the corresponding cell of the 3D geometry grid, for which then the orientation and area is transformed into an occlusion distribution (S603). Finally, the distributions of all surfels projected into a respective cell is accumulated (summed-up) for all cells in the 3D geometry grid.

Figure 7:
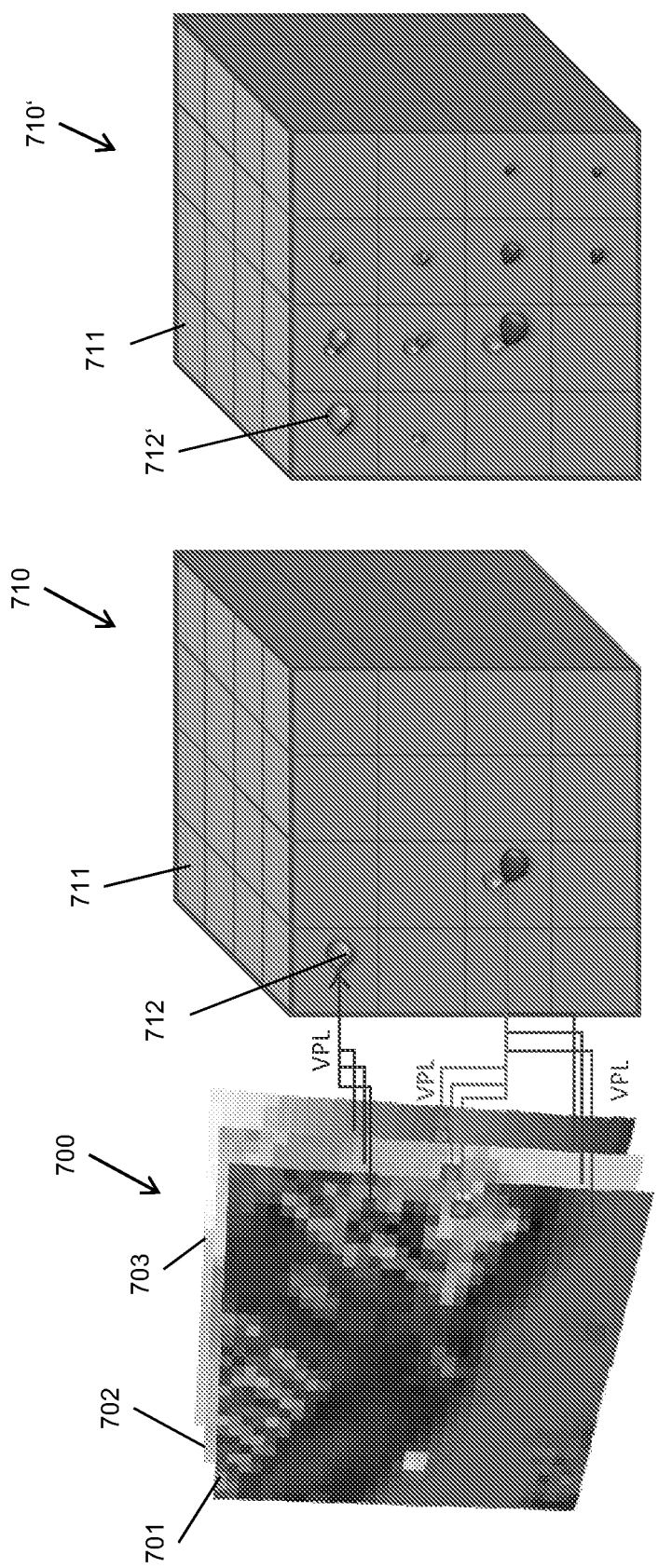
FIG. 7 is a schematic diagram showing the basic step of initializing a light propagation volume (LPV) by injecting the contributions of virtual (secondary) point light sources (VPL) into an LPV and computing propagation of light in said light propagation volume.
Figure 8:
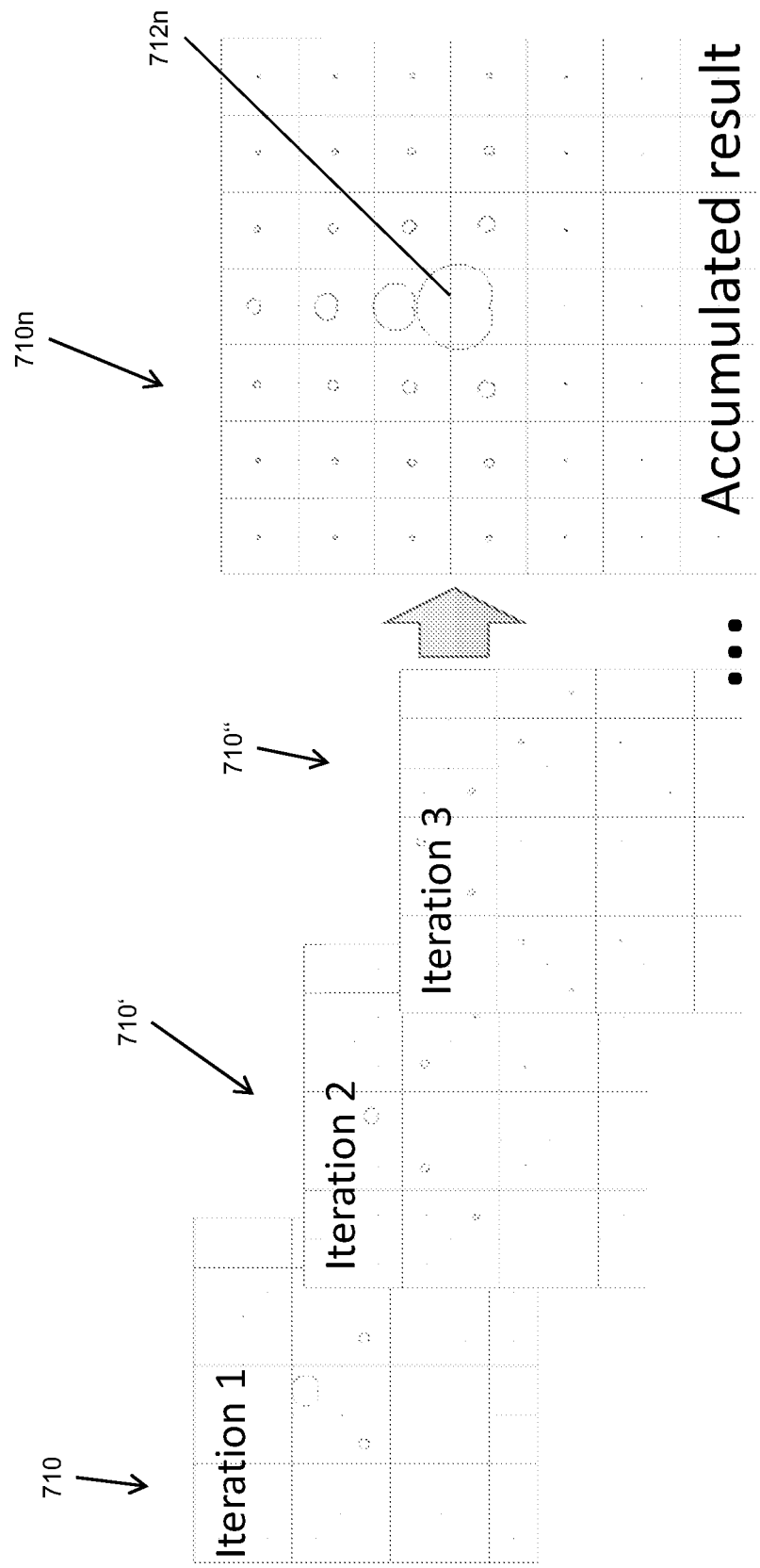
FIG. 8 is a schematic diagram showing further details of light propagation in the light propagation volume.
Figure 9:
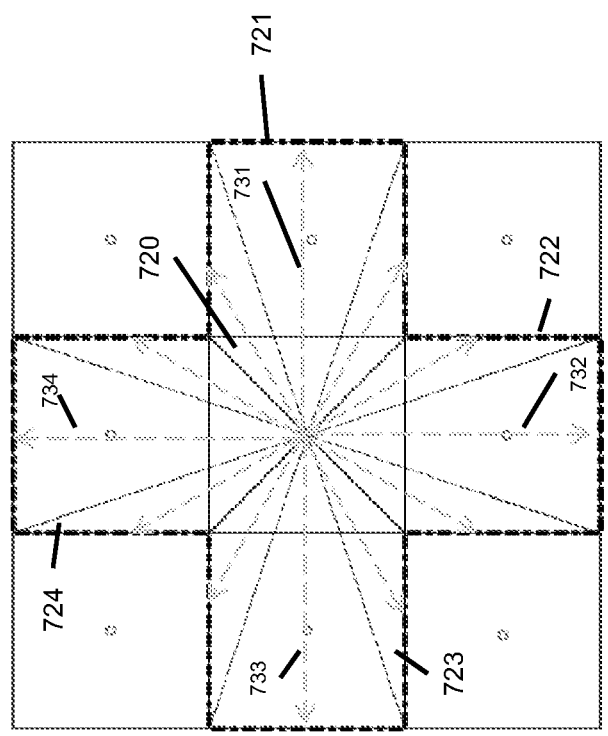
FIG. 9 is a schematic diagram showing the propagation of light from a source grid cell to adjacent destination grid cells of the light propagation volume.

FIG. 7 is a schematic diagram showing the basic step of initializing a light propagation volume (LPV) by injecting the contributions of virtual (secondary) point light sources (VPL) into an LPV and computing propagation of light in said light propagation volume. As shown in FIG. 7, the 3D scene geometry 700 (GV) consists of a plurality of 2D grids 701, . . . 703, each including a plurality of secondary light sources for indirect lighting. Reference numeral 710 designates the initial light propagation volume used for subsequently computing light propagation. As can be clearly seen in FIG. 7, the 3D grid of the light propagation volume 710 consists, as compared to the geometry volume, of a significantly reduced number of grid calls 711 which together represent the light propagation volume. As indicated by the interconnection lines in the left-hand part of FIG. 7, several secondary light sources (VPL) are mapped onto a single grid cell of the light propagation volume while their lighting contributions are accumulated (summed-up) to light distribution 712 of a respective grid cell 711. Starting with this initial light propagation volume the propagation of light from each grid cell to all six adjacent (neighboring) cells is computed for all grid cells, resulting in a modified lighting condition 710', which is used as the initial lighting distribution for a subsequent iteration step. As summarized in FIG. 8, this iteration proceeds until the nth iteration step is reached, in which case the step terminates, resulting in a lighting distribution $710''$, FIG. 9 is a schematic diagram showing the propagation of light from a source grid cell (center grid cell 720) to adjacent destination grid cells of the light propagation volume. For illustrative purposes a 2D-case is assumed, i.e. 4 neighboring grid cells 721-724. The lines 731-734 designate the normals from the central grid cell 720 onto the faces of the neighboring grid cells. The flux reaching the face of the respective adjacent grid cell is computed by integrating over the respective angular range.

FIGS. 11a and 11b shows intensity distributions that can result from occluding objects (indicated by dashed lines) disposed between neighboring grid cells in the light propagation volume.

Figure 14A:
FIG. 14a depicts a screenshot computed in real-time from a computer game of the applicant without indirect lighting contributions.
Figure 14B:
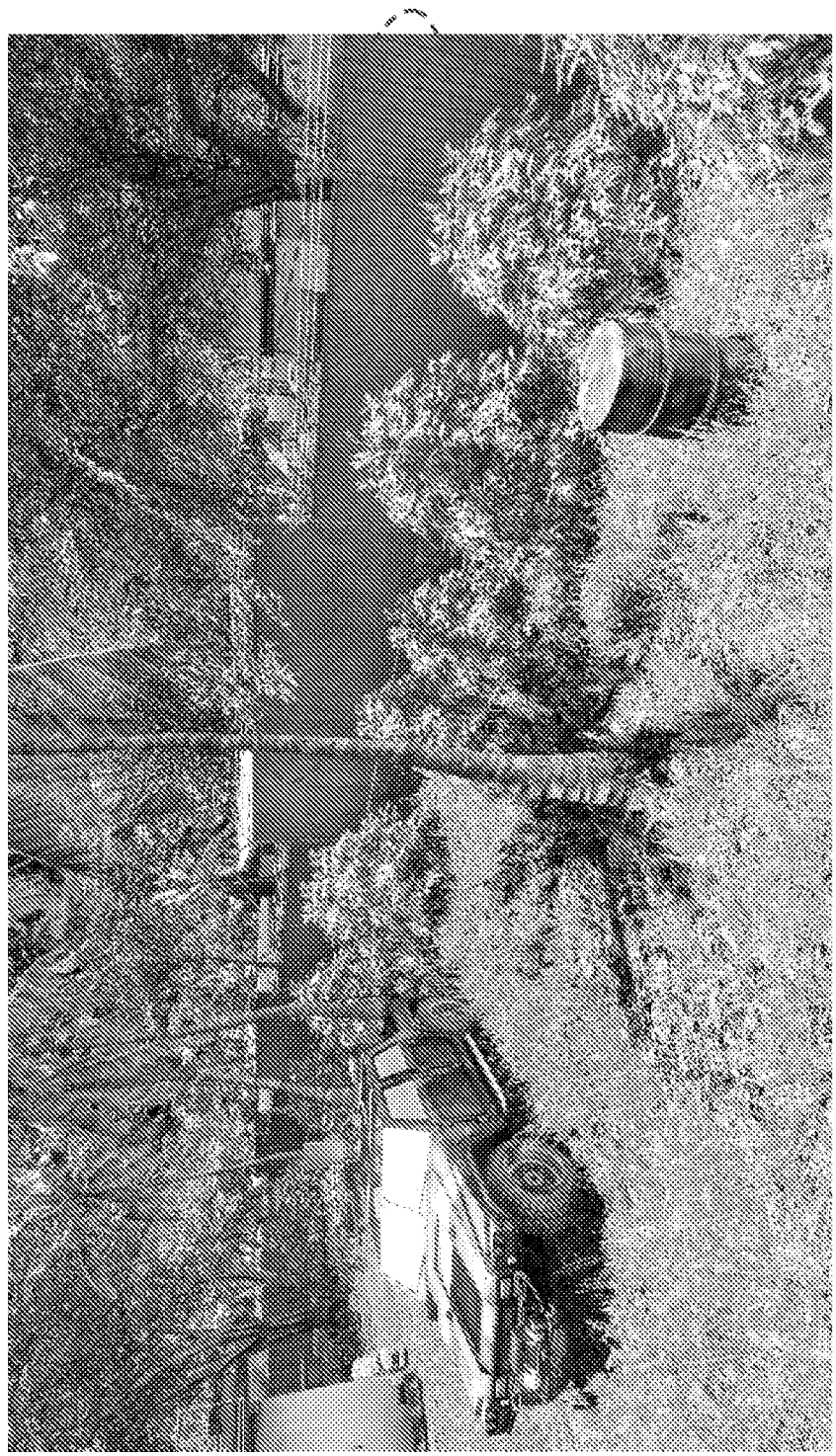
FIG. 14b depicts the same screenshot as in FIG. 14a computed in real-time from a computer game of the applicant but with indirect lighting contributions from the foliage disposed along the fence shown in the scene.

FIG. 14a depicts a screenshot computed in real-time from a computer game of the applicant without indirect lighting contributions. In comparison FIG. 14b depicts the same screenshot as in FIG. 14a computed in real-time from a computer game of the applicant but with indirect lighting contributions from the foliage disposed along the fence shown in the scene using the method according to the present invention.

Figure 15A:
FIGS. 15a and 15b compare the results of cascaded light indirect illumination.
Figure 15B:

Finally FIGS. 15a and 15b compare the results of cascaded light indirect illumination as outlined above. The idea behind 'cascaded light indirect illumination' is that the computing time scales usually with third power of the total number n of virtual point light sources considered in the scene, which usually makes it impossible to support large scenes including a high total number of virtual point light sources. In order to reduce the computing time, multiple grids are used for computing light propagation, wherein the resolution is high only nearby pre-determined location(s) of interest but reduced for locations farther away.

The invention can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "get," "adjust," and "apply" to describe computer operations in a computing environment. These terms are high-level abstractions for operations performed by a computer, and should not be confused with acts performed by a human being. The actual computer operations corresponding to these terms vary depending on implementation.

Having described and illustrated the principles of our invention with reference to an illustrative embodiment, it will be recognized that the illustrative embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein.

Elements of the illustrative embodiment shown in software may be implemented in hardware and vice versa.

As will become apparent to a person skilled in the art, the present invention is not limited to computing of indirect illumination in a computer graphics image of a scene but can be applied to computing of other lighting conditions in computer graphics as well, e.g. to computing of direct illumination instead of indirect illumination. Furthermore, use of reflective shadow maps (RSMs) is not essential for implementing the present invention. Instead, any arbitrary alternative scene representation could be used as well as the basis for the lighting representation. Instead, the most important features according to the present invention are merely using a lattice, i.e. the light propagation volume, and approximation of the light intensity distribution by spherical harmonics. An initial light intensity distribution is injected into the light propagation volume, basically as outlined above, and the light propagation is then computed in said light propagation volume until a sufficiently realistic propagated light intensity distribution is obtained, on the basis of which finally the scene is rendered.

In view of the many possible embodiments to which the principles of our invention may be applied, we claim as our invention all such embodiments as may come within the scope and spirit of the following claims and equivalents thereto.

LIST OF REFERENCES

The references listed in the following are introduced in the above description by mentioning the first author in brackets, to be followed by the year of publication:

BAVOIL, L., SAINZ, M., AND DIMITROV, R., 2008. Image-space horizon-based ambient occlusion. ACM SIGGRAPH 2008 talks.

BUNNELL, M. 2005. GPU Gems 2: Programming Techniques for High-Performance Graphics and General-Purpose Computation. Addison-Wesley Professional, ch. Dynamic Ambient Occlusion and Indirect Lighting, 636-648.

CHANDRASEKHAR, S. 1950. Radiative Transfer. Dover Pubn Inc.

DACHSBACHER, C., AND STAMMINGER, M. 2005. Reflective shadow maps. In Proc. of the Symposium on Interactive 3D Graphics and Games, 203-213.

DACHSBACHER, C., AND STAMMINGER, M. 2006. Splatting Indirect Illumination. In Proc. of the Symposium on Interactive 3D Graphics and Games, 93-100.

DACHSBACHER, C., STAMMINGER, M., DRETTAKIS, G., AND DURAND, F. 2007. Implicit visibility and anti-radiance for interactive global illumination. ACM Transactions on Graphics (Proc. of SIGGRAPH 2007) 26, 3.

DONG, Z., KAUTZ, J., THEOBALT, C., AND SEIDEL, H.-P. 2007. Interactive Global Illumination Using Implicit Visibility. In Pacific Graphics, 77-86.

DUTRÉ, P., BALA, K., AND BEKAERT, P. 2006. Advanced Global Illumination.

A K Peters. FATTAL, R. 2009. Participating media illumination using light propagation maps. ACM Transaction on Graphics 28, 1, 1-11.

GEIST, R., RASCHE, K., WESTALL, J., AND SCHALKOFF, R. J. 2004. Lattice-Boltzmann lighting. In Rendering Techniques 2004 (Proc. of the Eurographics Symposium on Rendering), 355-362).

GREGER, G., SHIRLEY, P., HUBBARD, P. M., AND GREENBERG, D. P. 1998. The irradiance volume. IEEE Computer Graphics Applications 18, 2, 32-43.

HAŠAN, M., PELLACINI, F., AND BALA, K. 2007. Matrix row-column sampling for the many-light problem. ACM Trans. Graph. 26, 3, 26.

IWASAKI, K., DOBASHI, Y., YOSHIMOTO, F., AND NISHITA, T. 2007. Precomputed radiance transfer for dynamic scenes taking into account light interreflection. In Rendering Techniques 2007 (Proc. of the Eurographics Symposium on Rendering), 35-44.

KELLER, A. 1997. Instant radiosity. In SIGGRAPH '97: Proceedings of the 24th annual conference on Computer graphics and interactive techniques, 49-56.

KRIVANEK, J., AND COLBERT, M. 2008. Real-time shading with filtered importance sampling. Computer Graphics Forum 27, 4, 1147-1154.

LOSASSO, F., AND HOPPE, H. 2004. Geometry clipmaps: terrain rendering using nested regular grids. In SIGGRAPH '04: ACM SIGGRAPH 2004 Papers, 769-776.

MCGUIRE, M., AND LUEBKE, D. 2009. Hardware-accelerated global illumination by image space photon mapping. In HPG '09: Proceedings of the Conference on High Performance Graphics 2009, 77-89.

MITTRING, M. 2007. Finding Next-Gen: CryEngine 2. In SIG-GRAPH'07: ACM SIGGRAPH 2007 courses.

NICHOLS, G., AND WYMAN, C. 2009. Multiresolution splatting for indirect illumination. In I3D '09: Proceedings of the 2009 symposium on Interactive 3D graphics and games, 83-90.

NICHOLS, G., SHOPF, J., AND WYMAN, C. 2009. Hierarchical image-space radiosity for interactive global illumination. Computer Graphics Forum 28, 4, 1141-1149.

OAT, C. 2006. Irradiance volumes for real-time rendering. ShaderX 5: Advanced Rendering Techniques.

RAMAMOORTHI, R., AND HANRAHAN, P. 2001. On the relationship between radiance and irradiance: determining the illumination from images of a convex Lambertian object. J. Opt. Soc. Am. A 18, 10, 2448-2459.

RAMANKUTTY, M. A., AND CROSBIE, A. L. 1997. Modified discrete ordinates solution of radiative transfer in two-dimensional rectangular enclosures. J. Quantitative Spectroscopy Radiative Transfer 57, 107-140.

RITSCHEL, T., GROSCH, T., KIM, M. H., SEIDEL, H.-P., DACHSBACHER, C., AND KAUTZ, J. 2008. Imperfect shadow maps for efficient computation of indirect illumination. ACM Transactions on Graphics (Proc. of SIGGRAPH Asia) 27, 5.

RITSCHEL, T., ENGELHARDT, T., GROSCH, T., SEIDEL, H.-P., KAUTZ, J., AND DACHSBACHER, C. 2009. Micro-rendering for scalable, parallel final gathering. ACM Trans. Graph. (Proc. SIGGRAPH Asia 2009) 28, 5.

RITSCHEL, T., GROSCH, T., AND SEIDEL, H.-P. 2009. Approximating dynamic global illumination in image space. In I3D '09: Proceedings of the 2009 symposium on Interactive 3D graphics and games, 75-82.

SILLION, F. 1995. A Unified Hierarchical Algorithm for Global Illumination with Scattering Volumes and Object Clusters. IEEE Trans. on Visualization and Computer Graphics 1, 3, 240-254.

SLOAN, P.-P., KAUTZ, J., AND SNYDER, J. 2002. Precomputed radiance transfer for real-time rendering in dynamic, low-frequency lighting environments. ACM Transactions on Graphics (Proc. of SIGGRAPH 2002) 21, 3, 527-536.

SLOAN, P.-P., GOVINDARAJU, N., NOWROUZEZAHRAI, D., AND SNYDER, J. 2007. Image-based proxy accumulation for real-time soft global illumination. In Pacific Graphics, 97-105.

SLOAN, P.-P., 2008. Stupid spherical harmonics tricks. Presentation, Game Developer Conference (GDC2008), San Francisco, Calif., http://www.ppsloan.org/publications/StupidSH35.pdf.

TATARCHUK, N., CHEN, H., EVANS, A., KAPLANYAN, A., MOORE, J., JEFFRIES, D., YANG, J., AND ENGEL, W. 2009. Advances in Real-Time Rendering in 3D Graphics and Games. In SIGGRAPH'09: ACM SIGGRAPH 2009 courses.

WALTER, B., FERNANDEZ, S., ARBREE, A., BALA, K., DONIKIAN, M., AND GREENBERG, D. P. 2005. Lightcuts: A scalable approach to illumination. ACM Transactions on Graphics (Proc. of SIGGRAPH 2005) 24, 3, 1098-1107.

WANG, R., WANG, R., ZHOU, K., PAN, M., AND BAO, H. 2009. An efficient gpu-based approach for interactive global illumination. ACM Transactions on Graphics (Proc. of SIGGRAPH 2009) 28, 3, 1-8.

YU, I., COX, A., KIM, M. H., RITSCHEL, T., GROSCH, T., DACHSBACHER, C., AND KAUTZ, J. 2009. Perceptual influence of approximate visibility in indirect illumination. ACM Transactions on Applied Perception 6, 4, 1-14.

What is claimed is:

1. A computer implemented method for real-time computing of indirect illumination in a computer graphics image of a scene, comprising:
  using a processor, defining in said scene a plurality of locations, attributing orientation and color to surface elements at said locations and defining a plurality of primary light sources;
  from a primary light source's point of view collecting depth information, orientation information and color information for said surface elements to thereby define a plurality of secondary light sources;
  using the processor, defining a light propagation volume as a three-dimensional grid consisting of a plurality of grid cells;
  using the processor, allocating said plurality of secondary light sources to grid cells of said light propagation volume, wherein said allocating comprises projecting said plurality of secondary light sources onto the grid cells of said light propagation volume;
  accumulating directional, colored irradiance contributions of all secondary light sources in a respective grid cell and repeating said step of accumulating directional, colored irradiance contributions of all secondary light sources for all grid cells of said light propagation volume to thereby obtain an initial indirect light intensity distribution;
  using the processor, iteratively computing the propagation of light in said light propagation volume starting with said initial indirect light intensity for a predetermined number of times to thereby obtain a final indirect light intensity distribution; and
  rendering the scene illuminated by said final indirect light intensity distribution during a usual scene rendering process from a camera's point of view;
  wherein, for each step of iteratively computing the propagation of light in said light propagation volume, the light intensity distribution from a previous iteration step is taken as an input light intensity distribution for a subsequent iteration step.

2. The method as claimed in claim 1, wherein a reflective shadow map (RSM) is computed for each primary light source, each texture element of said reflective shadow map representing a small secondary light source with a given spectral and directional light intensity distribution $$I_p(\omega)=\phi_p<n_p|\omega>_|,$$

wherein
  $n_p$ denotes the orientation of said texture element,
  $\phi_p$ denotes the reflected flux of said texture element, and
  $<.|.>_|$ denotes the dot product with negative values clamped to zero.

3. The method as claimed in claim 2, wherein
  the directional light intensity distribution of each secondary light source is developed into a series of spherical harmonic basis functions and
  said step of accumulating directional, colored irradiance contributions of all secondary light sources in a respective grid cell comprises:
  scaling the coefficients by the color and intensity of the respective secondary light source and
  accumulating spherical harmonics coefficients of a respective series of spherical harmonic basis functions to thereby obtain initial spherical harmonics coefficients for each of said grid cells.

4. The method as claimed in claim 3, wherein said series of spherical harmonic basis functions correspond to a clamped cosine-lobe centered around a given direction vector, a normal of each of said grid cells being given by $n_p$.

5. The method as claimed in claim 4, wherein said step of allocating said plurality of secondary light sources to grid cell of said light propagation volume comprises
  moving each secondary light source by half a grid cell spacing in the direction of a normal of said respective grid cell before allocating or determining said respective grid cell and
  taking only the orientation of a respective secondary light source into consideration but ignoring the exact positioning of said respective primary light source inside said grid cell.

6. The method as claimed in claim 5, wherein said steps of allocating said plurality of secondary light sources to grid cells of said light propagation volume and accumulating directional, colored light intensity distributions of all secondary light sources in a respective grid cell is performed for each RGB color value using three-coefficient vectors to thereby obtain said initial light intensity distribution.

7. The method as claimed in claim 4, further comprising:
  defining a set of occluding surface elements in said scene with a given location, orientation and size; wherein
  the blocking probability of a surface element with area As, and normal $n_s$ in a cell of grid size s is given by:

$$B(\omega)=A_s s^{-2}<n_s|\omega>_|,$$

wherein $<.|.>_|$ denotes the dot product with negative values clamped to zero; and
  wherein the blocking probabilities of said surface elements are accumulated in a geometry volume, which is a further three-dimensional grid having the same resolution as said light propagation volume and is shifted by half a cell relative to said light propagation volume such that cell centers of said geometry volume are located at the corners of the cells of said light propagation volume, to thereby obtain a directional occlusion distribution.

8. The method as claimed in claim 7, wherein said set of occluding surface elements in said scene is defined by re-using the sampling of the scene's surfaces stored in depth and normal buffers from the camera's point of view and in the reflective shadow maps.

9. The method as claimed in claim 8, wherein said step of accumulating said blocking probabilities of said occluding surface elements comprises:

developing the blocking probabilities of each occluding surface element into a series of spherical harmonic basis functions and accumulating spherical harmonics coefficients of a respective series of spherical harmonic basis functions in said geometry volume to thereby obtain a representation of said directional occlusion distribution given by spherical harmonics coefficient vectors.

10. The method as claimed in claim 9, wherein each buffer is accumulated into a separate geometry volume and after accumulating the spherical harmonics coefficients of a respective series of spherical harmonic basis functions in a respective one of said separate geometry volumes all separate geometry volumes are merged into a final geometry volume using a maximum operation on the spherical harmonics coefficient vectors.

11. The method as claimed in claim 10, wherein occluding surface elements and secondary light sources are re-used from a previously computed image frame.

12. The method as claimed in claim 7, wherein, for each step of iteratively computing the propagation of light in said light propagation volume, a projection of light from a source grid cell onto faces of adjacent destination grid cells is computed and the contributions from said faces are re-projected into the center of the destination cell for a subsequent iteration step.

13. The method as claimed in claim 12, wherein said step of iteratively computing the propagation of light in said light propagating volume comprises:

calculating a spherical harmonics representation of the light intensity of a source grid cell as $I(\omega) \approx \Sigma_{l,m} c_{l,m} y_{l,m}(\omega)$;

projecting each face's visibility function $V(\omega)$ into a spherical harmonics representation; and approximating the integral of the light intensity times visibility by calculating the dot product of the spherical harmonics vectors of said light intensity and said visibility function.

14. The method as claimed in claim 12, wherein said step of iteratively computing the propagation of light in said light propagation volume comprises:

determining a central direction $\omega_c$ from the center of a source grid cell towards each face of an adjacent destination grid cell; and approximating the average intensity over the solid angle of each face of an adjacent destination grid cell by the intensity in the central direction $\omega_c$.

15. The method as claimed in 12, wherein the spherical harmonics vectors of the geometry volume are bi-linearly interpolated at the center of the respective face of an adjacent grid cell through which light propagation is computed and the light intensity is attenuated by the respective blocking probability in the respective propagation direction.

16. A computer graphics image rendering system comprising a processor and a memory, wherein the memory further comprises executable code for real-time computing of indirect illumination in a computer graphics image of a scene, said computing means for real-time computing of indirect illumination comprising:

means for defining in said scene a plurality of locations, attributing orientation and color to surface elements at said locations and defining a plurality of primary light sources;

means for collecting, from a primary light source's point of view, depth information, orientation information and color information for said surface elements to thereby define a plurality of secondary light sources;

means for defining a light propagation volume as a three-dimensional grid consisting of a plurality of grid cells;

means for allocating said plurality of secondary light sources to grid cells of said light propagation volume, wherein said allocating comprises projecting said plurality of secondary light sources onto the grid cells of said light propagation volume;

means for accumulating directional, colored irradiance contributions of all secondary light sources in a respective grid cell and repeating said step of accumulating directional, colored irradiance contributions of all secondary light sources for all grid cells of said light propagation volume to thereby obtain an initial indirect light intensity distribution;

means for iteratively computing the propagation of light in said light propagation volume starting with said initial indirect light intensity for a predetermined number of times to thereby obtain a final indirect light intensity distribution; and means for rendering the scene illuminated by said final indirect light intensity distribution during a usual scene rendering process from a camera's point of view;

wherein, for each step of iteratively computing the propagation of light in said light propagation volume, the light intensity distribution from a previous iteration step is taken as an input light intensity distribution for a subsequent iteration step.

17. The computer graphics image rendering system as claimed in claim 16, wherein a reflective shadow map (RSM) is computed for each primary light source, each texture element of said reflective shadow map representing a small secondary light source with a given spectral and directional light intensity distribution $$I_p(\omega) = \phi_p <n_p|\omega>_|,$$

wherein $n_p$ denotes the orientation of said texture element, $\phi_p$ denotes the reflected flux of said texture element, and $<,|,>_|$ denotes the dot product with negative values clamped to zero.

18. The computer graphics image rendering system as claimed in claim 17, wherein the directional light intensity distribution of each secondary light source is developed into a series of spherical harmonic basis functions and said step of accumulating directional, colored irradiance contributions of all secondary light sources in a respective grid cell comprises:

scaling the coefficients by the color and intensity of the respective secondary light source and accumulating spherical harmonics coefficients of a respective series of spherical harmonic basis functions to thereby obtain initial spherical harmonics coefficients for each of said grid cells.

19. The computer graphics image rendering system as claimed in claim 18, wherein said series of spherical harmonic basis functions correspond to a clamped cosine-lobe centered around a given direction vector, a normal of each of said grid cells being given by $n_p$.

20. The computer graphics image rendering system as claimed in claim 19, wherein said means for allocating said plurality of secondary light sources to grid cell of said light propagation volume comprises:

means for moving each secondary light source by half a grid cell spacing in the direction of a normal of said respective grid cell before allocating or determining said respective grid cell and means for taking only the orientation of a respective secondary light source into consideration but ignoring the exact positioning of said respective primary light source inside said grid cell.

21. The computer graphics image rendering system as claimed in claim 20, wherein said means for allocating said plurality of secondary light sources to grid cells of said light propagation volume and said means for accumulating directional, colored light intensity distributions of all secondary light sources in a respective grid cell are configured to perform said steps of allocating said plurality of secondary light sources to grid cells of said light propagation volume and accumulating directional, colored light intensity distributions of all secondary light sources in a respective grid cell for each RGB color value using three-coefficient vectors to thereby obtain said initial light intensity distribution.

22. The computer graphics image rendering system as claimed in claim 19, further comprising:
means for defining a set of occluding surface elements in said scene with a given location, orientation and size; wherein
the blocking probability of a surface element with area $A_s$ and normal $n_s$ in a cell of grid size s is given by:

$$B(\omega)=A_s s^{-2}<n_s|\omega>_|,$$

wherein $<.|.>_|$ denotes the dot product with negative values clamped to zero; and
wherein the blocking probabilities of said surface elements are accumulated in a geometry volume, which is a further three-dimensional grid having the same resolution as said light propagation volume and is shifted by half a cell relative to said light propagation volume such that cell centers of said geometry volume are located at the corners of the cells of said light propagation volume, to thereby obtain a directional occlusion distribution.

23. The computer graphics image rendering system as claimed in claim 22, wherein said set of occluding surface elements in said scene is defined by re-using the sampling of the scene's surfaces stored in depth and normal buffers from the camera's point of view and in the reflective shadow maps.

24. The computer graphics image rendering system as claimed in claim 23, wherein said step of accumulating said blocking probabilities of said occluding surface elements comprises:
developing the blocking probabilities of each occluding surface element into a series of spherical harmonic basis functions and
accumulating spherical harmonics coefficients of a respective series of spherical harmonic basis functions in said geometry volume to thereby obtain a representation of said directional occlusion distribution given by spherical harmonics coefficient vectors.

25. The computer graphics image rendering system as claimed in claim 24, wherein each buffer is accumulated into a separate geometry volume and after accumulating the spherical harmonics coefficients of a respective series of spherical harmonic basis functions in a respective one of said separate geometry volumes all separate geometry volumes are merged into a final geometry volume using a maximum operation on the spherical harmonics coefficient vectors.

26. The computer graphics image rendering system as claimed in claim 25, wherein occluding surface elements and secondary light sources are re-used from a previously computed image frame.

27. The computer graphics image rendering system as claimed in claim 22, wherein, for each step of iteratively computing the propagation of light in said light propagation volume, a projection of light from a source grid cell onto faces of adjacent destination grid cells is computed and the contributions from said faces are re-projected into the center of the destination cell for a subsequent iteration step.

28. The computer graphics image rendering system as claimed in claim 27, wherein said step of iteratively computing the propagation of light in said light propagating volume comprises:
calculating a spherical harmonics representation of the light intensity of a source grid cell as $I(\omega)\approx\Sigma_{l,m}\approx\Sigma_{l,m}c_{l,m}y_{l,m}(\omega)$;
projecting each face's visibility function $V(\omega)$ into a spherical harmonics representation; and
approximating the integral of the light intensity times visibility by calculating the dot product of the spherical harmonics vectors of said light intensity and said visibility function.

29. The computer graphics image rendering system as claimed in claim 27, wherein said step of iteratively computing the propagation of light in said light propagation volume comprises:
determining a central direction $\omega_c$ from the center of a source grid cell towards each face of an adjacent destination grid cell; and
approximating the average intensity over the solid angle of each face of an adjacent destination grid cell by the intensity in the central direction $\omega_c$.

30. The computer graphics image rendering system as claimed in claim 27, wherein the spherical harmonics vectors of the geometry volume are bi-linearly interpolated at the center of the respective face of an adjacent grid cell through which light propagation is computed and the light intensity is attenuated by the respective blocking probability in the respective propagation direction.

31. A computer-readable data storage medium having non-transitory program code stored thereon and executable on a graphics image processing device to perform a method for real-time computing of indirect illumination in a computer graphics image of a scene, wherein the computer-readable data storage medium comprises a physical storage medium for data storage, the method comprising:
defining in said scene a plurality of locations, attributing orientation and color to surface elements at said locations and defining a plurality of primary light sources;
from a primary light source's point of view collecting depth information, orientation information and color information for said surface elements to thereby define a plurality of secondary light sources;
defining a light propagation volume as a three-dimensional grid consisting of a plurality of grid cells;
allocating said plurality of secondary light sources to grid cells of said light propagation volume, wherein said allocating comprises projecting said plurality of secondary light sources onto the grid cells of said light propagation volume;
accumulating directional, colored irradiance contributions of all secondary light sources in a respective grid cell and repeating said step of accumulating directional, colored irradiance contributions of all secondary light sources for all grid cells of said light propagation volume to thereby obtain an initial indirect light intensity distribution;
iteratively computing the propagation of light in said light propagation volume starting with said initial indirect light intensity for a predetermined number of times to thereby obtain a final indirect light intensity distribution; and rendering the scene illuminated by said final indirect light intensity distribution during a usual scene rendering process from a camera's point of view;
wherein, for each step of iteratively computing the propagation of light in said light propagation volume, the light intensity distribution from a previous iteration step is taken as an input light intensity distribution for a subsequent iteration step.

* * * * *